(12) United States Patent  
Winkler et al.

(10) Patent No.: US 11,699,132 B1
(45) Date of Patent: Jul. 11, 2023

(54) METHODS AND SYSTEMS FOR FACILITATING FAMILY-BASED REVIEW

(71) Applicant: RELATIVITY ODA LLC, Chicago, IL (US)

(72) Inventors: Jesse Allan Winkler, Cincinnati, OH (US); Elise Tropiano, Evanston, IL (US); Robert Jenson Price, Leesburg, VA (US); Brandon Gauthier, Centreville, VA (US); Theo Van Wijk, Chicago, IL (US); Patricia Ann Gleason, Chicago, IL (US)

(73) Assignee: RELATIVITY ODA LLC, Chicago, IL (US)

( * ) Notice: Subject to any disclaimer, the term of this patent is extended or adjusted under 35 U.S.C. 154(b) by 0 days.

(21) Appl. No.: 17/077,620

(22) Filed: Oct. 22, 2020

Related U.S. Application Data

(60) Provisional application No. 62/924,969, filed on Oct. 23, 2019.

(51) Int. Cl.
*G06N 20/00* (2019.01)
*G06Q 10/107* (2023.01)
(Continued)

(52) U.S. Cl.
CPC ..... *G06Q 10/107* (2013.01); *G06F 16/24578* (2019.01); *G06F 16/285* (2019.01);
(Continued)

(58) Field of Classification Search
CPC ............. G06N 20/00; G06F 16/24578
See application file for complete search history.

(56) References Cited

U.S. PATENT DOCUMENTS 8,635,172 B1  1/2014  Buryak et al.
9,514,414 B1  12/2016  Rosswog et al.
(Continued)

OTHER PUBLICATIONS

Dasgupta et al., Which clustering do you want? Inducing your ideal clustering with minimal feedback, Journal of Artificial Intelligence Research (Sep. 2010).

(Continued)

*Primary Examiner* — Hau H Hoang
(74) *Attorney, Agent, or Firm* — Marshall, Gerstein & Borun LLP; Randall G. Rueth

(57) ABSTRACT

A active learning family-based review method includes selecting a document ranked as relevant by a machine learning model, identifying family documents relationally-linked to the ranked relevant document, generating a batch including the ranked relevant document adjacent to the family documents, and displaying the batch in a computing device. An active learning family-based review computing system includes a processor and a memory storing instructions that, when executed, cause the computing system to select a relevant document using machine learning, identify family documents, generate a batch including the relevant document adjacent to the family documents, and display the batch. A non-transitory computer readable medium stores program instructions that when executed, cause a computer system to select a relevant document using machine learning, identify family documents, generate a batch including the relevant document adjacent to the family documents, and display the batch.

20 Claims, 14 Drawing Sheets

(51) Int. Cl.
   *G06Q 30/018* (2023.01)
   *G06F 16/2457* (2019.01)
   *G06F 16/28* (2019.01)
   *G06Q 50/18* (2012.01)

(52) U.S. Cl.
   CPC ........... *G06N 20/00* (2019.01); *G06Q 30/018* (2013.01); *G06Q 50/18* (2013.01)

(56) References Cited

U.S. PATENT DOCUMENTS

| | | | |
|---|---|---|---|
| 10,140,553 B1 | 11/2018 | Vasisht et al. | |
| 10,911,386 B1 * | 2/2021 | Beckman | H04L 51/216 |
| 2008/0103996 A1 | 5/2008 | Forman et al. | |
| 2009/0083200 A1 | 3/2009 | Pollara et al. | |
| 2009/0216696 A1 | 8/2009 | Downs et al. | |
| 2009/0265609 A1 * | 10/2009 | Rangan | G06F 16/93 715/234 |
| 2010/0217732 A1 | 8/2010 | Yang et al. | |
| 2010/0312764 A1 | 12/2010 | Liao et al. | |
| 2014/0279716 A1 * | 9/2014 | Cormack | G06F 16/285 706/10 |
| 2014/0280173 A1 | 9/2014 | Scholtes et al. | |
| 2015/0016699 A1 | 1/2015 | Ritt et al. | |
| 2015/0339572 A1 | 11/2015 | Achin et al. | |
| 2016/0307113 A1 | 10/2016 | Calapodescu et al. | |
| 2016/0371260 A1 | 12/2016 | Cormack et al. | |
| 2016/0371261 A1 * | 12/2016 | Cormack | G06F 16/35 |
| 2017/0098138 A1 | 4/2017 | Wang et al. | |
| 2017/0116519 A1 | 4/2017 | Johnson et al. | |
| 2018/0189615 A1 | 7/2018 | Kang et al. | |
| 2018/0330280 A1 | 11/2018 | Erenrich et al. | |
| 2019/0034822 A1 | 1/2019 | Farre Guiu et al. | |
| 2019/0042975 A1 * | 2/2019 | Yoshikawa | G06F 16/9024 |

OTHER PUBLICATIONS

Fu et al., Low density separation as a stopping criterion for active learning SVM, Intelligent Data Analysis, 19:727-41 (2015).

Kamm et al., Robustness aspects of active learning for acoustic models, INTERSPEECH 2004—ICSLP, 8th International Conference on Spoken Language Processing, Jeju Island, Korea, Oct. 4-8, 2004.

Papi, An artificial intelligence application for architectural textures analysis, International Society for Photogrammetry and Remote Sensing Conference, Ancona, Italy, 4 pp. (2003).

Pickens et al., Break up the family: Protocols for efficient recall-oriented retrieval under legally-necessitated dual constraints, 2018 IEEE International Conference on Big Data, 8 pp. (2018).

Vlachos, A stopping criterion for active learning, Computer Speech and Language, 22:295-312 (2008).

Zhu et al., Confidence-based stopping criteria for active learning for data annotation, ACM Transactions on Speech and Language Processing, vol. 6, No. 3, Article 3 (Apr. 2010).

* cited by examiner

METHODS AND SYSTEMS FOR FACILITATING FAMILY-BASED REVIEW

CROSS-REFERENCE TO RELATED APPLICATIONS

This Application claims the benefit of U.S. Provisional Application 62/924,969, entitled Methods and Systems for Facilitating Family-Based Review, filed on Oct. 23, 2019, the disclosure of which is hereby incorporated herein by reference.

FIELD OF THE DISCLOSURE

The present disclosure relates generally to facilitating family-based review of electronic correspondence and, more specifically, to methods and systems for facilitating family-based review of electronic communications based on document rankings generated by one or more trained machine learning model.

BACKGROUND

In the eDiscovery process commonly associated with litigation, for example, reviewers (e.g., attorneys) are commonly provided with a voluminous corpus of electronic communication documents (e.g., emails, file attachments, etc.) that conform to a discovery request. Analyzing each and every electronic communication document is a time consuming process. The corpus of electronic communication may contain a plurality of electronic communications, wherein each one includes multiple parts. For example, an email may include a multitude of attachments. The email may include a plurality of prior responses/replies (e.g., a forwarded email chain).

Existing document review technologies rank the relevance of the individual parts of electronic correspondence in isolation and present the documents most likely to be relevant to the discovery request to the reviewer. The reviewer is required to analyze each individual part separately, irrespective of whether other individual parts included in the same electronic correspondence may also include relevant/responsive information. For example, an email attachment may include relevant information. The attachment may be served to a reviewer, excluding the email body text to which the attachment relates. In particular, existing active learning techniques do not present families of documents (e.g., emails with attachments) together.

Conventional document review technologies conflict with discovery best practices, and in some cases, rules and/or precedent. For example, Rule 106 of the Federal Rules of Evidence states that "If a party introduces all or part of a writing . . . an adverse party may require the introduction, at that time, of any other part—or any other writing . . . that in fairness ought to be considered at the same time", and Rule 34 of the Federal Rules of Civil Procedure states, inter alia, that "A party must produce documents as they are kept in the usual course of business . . . ". Such rules are generally understood to imply that if an attachment is responsive, then the additional parts of the email to which the attachment belongs (e.g., body text, headers, other attachments) should be produced along with the responsive attachment. Attorneys in litigation often negotiate and stipulate to customized production agreements during meet and confer conferences, and as such, the inflexibility of conventional document review is a hindrance.

To address the realities of discovery rules, a party responding to discovery engages in a two-step process that is duplicative, time consuming, and inefficient. First, the responding party reviews documents relating to a production request using, for example, an active learning application that runs continuously updated cycles of documents for review, such as Relativity Active Learning, to generate a designated population of relevant documents. The party then re-reviews each individual document in the designated population along with any related documents. The requirement of conducting multiple rounds of document review wastes significant computational resources, because every document requires multiple processing and storage resources. More efficient and streamlined review techniques are needed.

In active learning, the goal is to analyze fewer than every document in a corpus, and to still identify many relevant documents with a minimized margin of error and a guarantee of confidence. However, at the outset of the active learning process, and as the process continues, the user does not know how much time the active learning project will take, or when to stop reviewing documents to reach the confidence level guarantee. In existing approaches to active learning, active learning chooses a sampling of documents (e.g., a random sampling) of unreviewed documents in the active learning project. The user chooses a desired rank cutoff and confidence level. The user then codes each of the documents, and elusion statistics (e.g., elusion rate, number of eluded documents, number of pending documents, etc.) are computed. If the desired confidence and margin of error are achieved, then the active learning process may be stopped. However, until the entire sampled data set is analyzed, the user cannot determine whether the desired confidence and margin of error will be achieved upon review of the sampled data set. Furthermore, if the desired confidence and margin of error are not achieved, the user may need to review another entire random sampling. It is very computationally expensive and time-consuming for a user to run successive elusion tests until the results are in the range that the user desires. More efficient and streamlined elusion evaluation techniques are needed.

Some clients have attempted to build algorithms for determining a stopping point for elusion testing, but these solutions are ad hoc and have been demonstrated to not work in practice. More robust techniques for determining an appropriate stopping point at which to run an elusion test are needed.

BRIEF SUMMARY

A computer-implemented method for conducting family-based review of a set of documents in an active learning process includes selecting, from the set of documents in the active learning process, a document ranked as relevant by a machine learning model, identifying a set of family documents relationally-linked to the ranked relevant document, generating a batch of documents based on the relevance rank for the set of documents, wherein the relationally-linked family documents are included in the batch adjacent to the ranked relevant document, and causing the batch of documents to be displayed on a display screen of a computing device.

In another embodiment, a family-based review computing system, includes one or more processors and a memory storing instructions. The instructions, when executed, cause the computing system to select, from a set of documents in an active learning process, a document ranked as relevant by a machine learning model, identify a set of family documents relationally-linked to the ranked relevant document, generate a batch of documents based on the relevance rank for the set of documents, wherein the relationally-linked family documents are included in the batch adjacent to the ranked relevant document, and cause the batch of documents to be displayed on a display screen of a computing device.

In yet another embodiment, a non-transitory computer readable medium stores program instructions that when executed, cause a computer system to select, from a set of documents in an active learning process, a document ranked as relevant by a machine learning model, identify a set of family documents relationally-linked to the ranked relevant document, generate a batch of documents based on the relevance rank for the set of documents, wherein the relationally-linked family documents are included in the batch adjacent to the ranked relevant document, and cause the batch of documents to be displayed on a display screen of a computing device.

DETAILED DESCRIPTION

I. Overview

The present techniques facilitate and deliver active learning methods and systems that enable family-based review (FBR) capabilities to an active learning workflow during discovery production, to avoid two-phase review of documents.

II. Example Active Learning Embodiment

Figure 1:
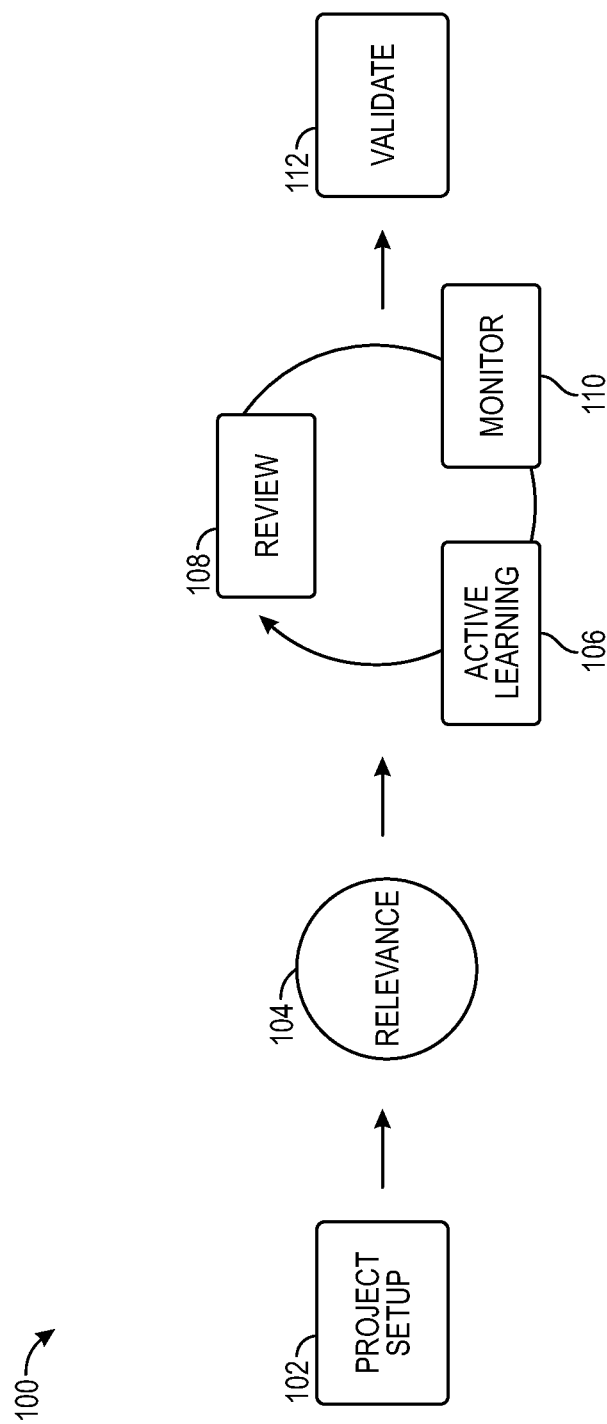
FIG. 1 depicts an example flow diagram of an active learning method, according to an embodiment.

FIG. 1 depicts an example flow diagram of an active learning method 100, according to an embodiment. Those of skill in the art will appreciate that FIG. 1 is intended to provide a high level overview of active learning, and is simplified for explanatory purposes. The active learning method 100 includes setting up an environment and workspace project for a production project (block 102). The setup step may include installing an active learning application, installing workspace components, and pre-project sampling. Pre-project sampling may include a user manually labeling a number of documents with a positive or negative value. Other steps in the active learning flow diagram 100 may use the labeled documents to initiate training of a model. A threshold number of positively labeled and negatively labeled documents (e.g., five) may be required before model training commences. In some embodiments, no pre-project sampling is performed. There, a subsequent step of the active learning method 100 may serve random documents to the reviewer to mark (e.g., as relevant/non-relevant) until the threshold number is reached. Such user-led marking is generally known as "coding." In some embodiments, the threshold number may be large (e.g., 100 or more documents). The setup step may include receiving a classification index choice, and a single-choice field option from the user. The classification index is an index type that refers to the task of classifying documents according to the single-choice field option. For example, the single-choice field may be relevant/not relevant, or privileged/not privileged.

The active learning method 100 includes analyzing documents for their relevance to the production request (block 104).

The active learning method 100 includes running an active learning application continuously to update a set of documents for review (block 106). The active learning application may include collecting coding decisions (e.g., indications of relevance) by the reviewing user (block 108). The active learning method 100 includes monitoring the user's review (block 110). The monitoring step may include displaying review that depicts a review field breakdown and relevance rate for a number of documents (e.g., for 200 documents). The user may monitor project progress by viewing a document rank distribution chart (e.g., a histogram) and a relevance rate in a prioritized review queue chart on the project home screen. Herein, a document's "rank" is a scaled relevance value assigned by a machine learning model or a default value. For example, a document of rank 0 is ranked least relevant, whereas a document with rank 100 is ranked most relevant. The active learning process may constantly predict the rank of each document in the set of documents (e.g., by the backend server executing one or more processes in parallel). The user may enter a manual responsive cutoff score appropriate for the project, wherein the responsive cutoff score indicates the lowest rank score that corresponds to a document classified as positive (e.g., a responsive single choice option). The prioritized review queue is described with more detail in with respect to FIG. 2.

The active learning method 100 includes validating the accuracy of negatively classified (i.e., non-responsive) documents (block 112). The validation step may include performing an elusion test, which allows the user to specify a minimum statistical rate corresponding to the number of relevant documents that elude identification. The validation step is typically performed when no new relevant documents are being served. However, as noted above, it is difficult to determine when it is appropriate to begin an elusion test (i.e., the appropriate stopping point). Determining the stopping point is discussed in further detail, below.

III. Queue Types

It should be appreciated that embodiments may use different multiple active learning queue types for different review types. For example, in a prioritization review, a prioritized review queue (PRQ) may be used. The PRQ may serve (e.g., receive/retrieve and display) documents that are most likely to be relevant from a set of documents. During the display of the most relevant documents, the PRQ may also serve documents that are selected from the set of documents at random. An active learning machine learning model may be incrementally trained as the user codes each of the served documents, and therefore, displaying random documents may ensure that the model is trained using a more representative range of the entire set of documents. In a coverage review, the goal may be to quickly separate documents into relevant/not relevant categories. Documents served in a coverage review queue begins by ranking all documents according to a relevance certainty score, and then serving documents to the reviewer(s) that have the lowest relevance certainty score (e.g., documents with a rank near 50).

IV. Family-Based Review Embodiment

An active learning queue includes a user interface. The user interface includes an option for enabling a FBR algorithm during execution of an active learning process. Once enabled, the next best document (e.g., the next most relevant document) is identified by the active learning process. When the next best document is identified, the FBR algorithm selects the family members of the document. For example, when the next best document is an email, the FBR algorithm selects the email to which the attachment belongs, in addition to other attachments of the email (i.e., a document family). The queue then selects an order in which to display the constituent parts of the document family. For example, the queue may display the parent email, followed by each attachment.

Figure 2:
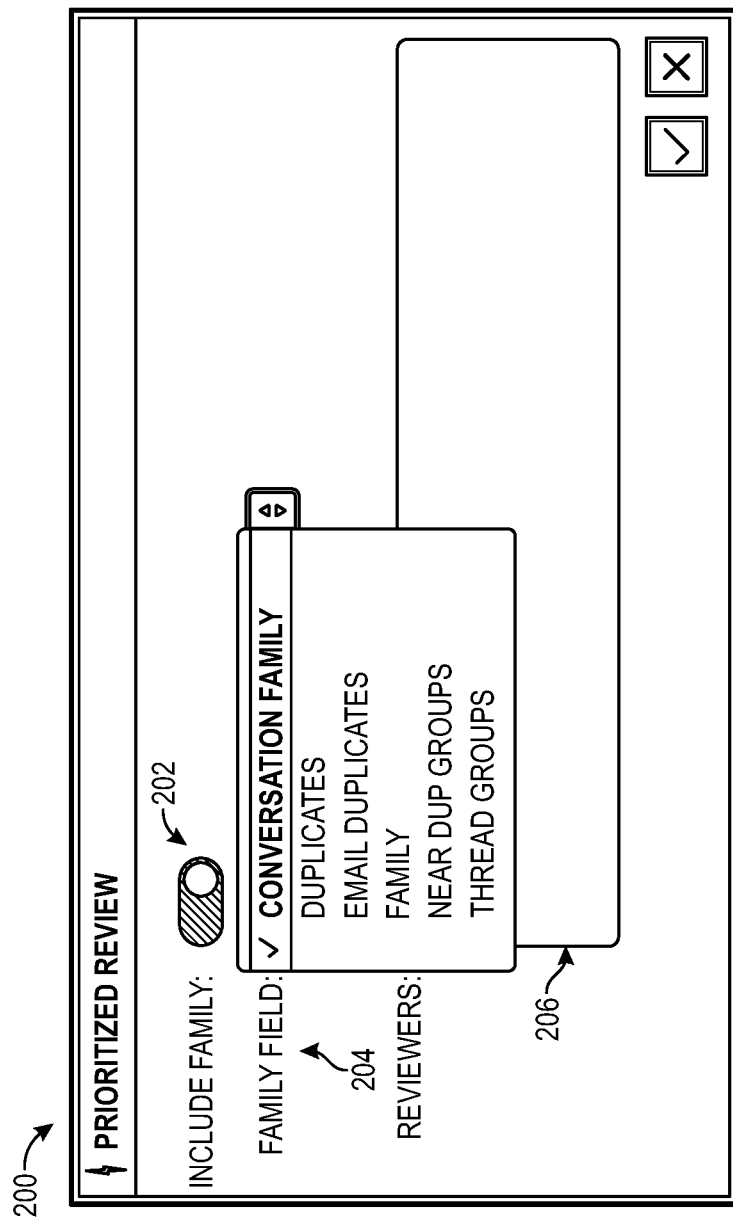
FIG. 2 depicts an example user interface for enabling family-based review in the active learning application, according to an embodiment.
Figure 3:
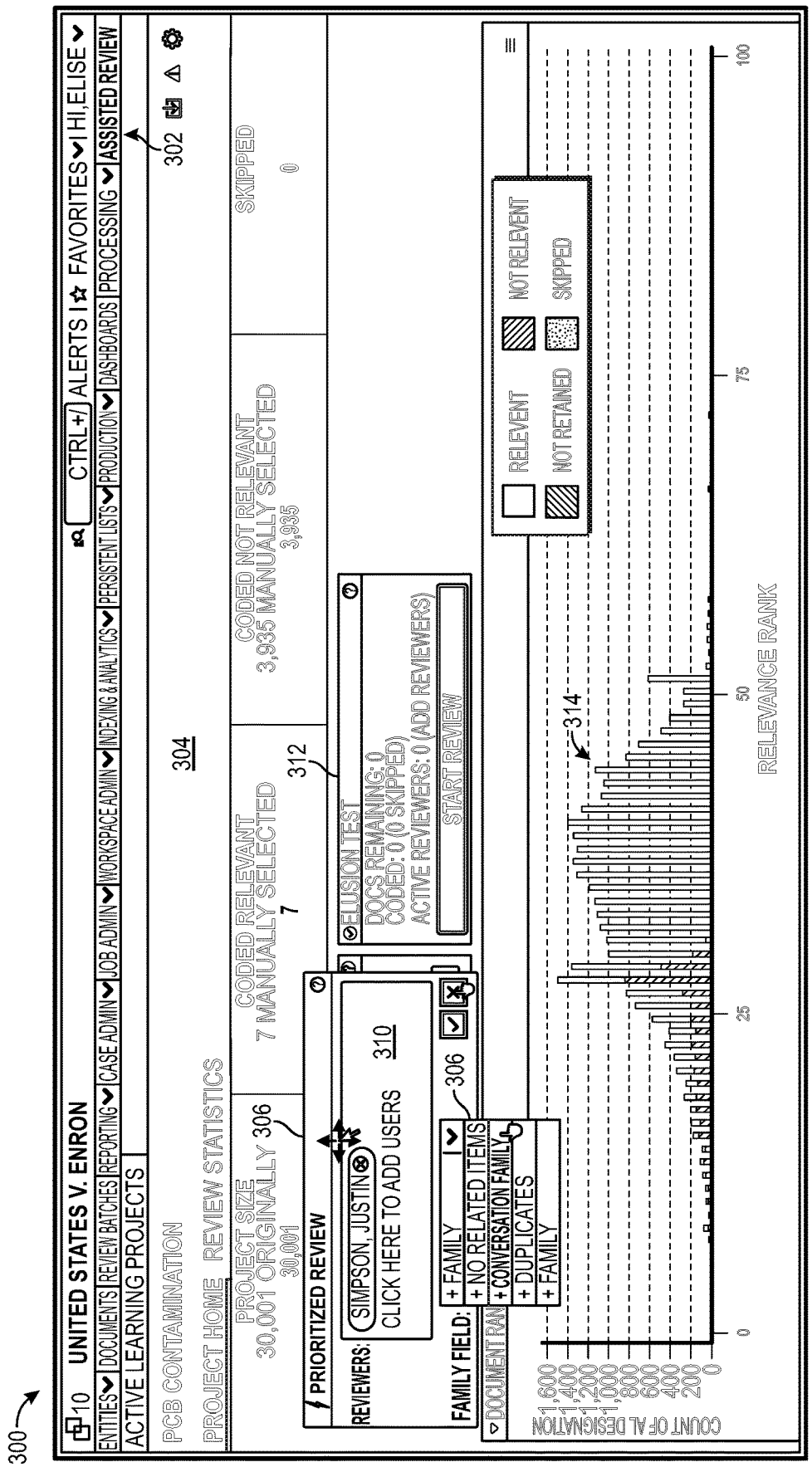
FIG. 3 depicts an example active learning application, according to an embodiment.

In operation, a reviewer may open the active learning application, such as the active learning application depicted in FIG. 3. FIG. 2 depicts an example user interface 200 for enabling family-based review in the active learning application. User interface 200 includes an "include family" selection 202 that enables family-based review. The user selects the selection 202. In response to the user selection, the active learning application selects the next best document that is most relevant. When the user selection 202 is enabled, selecting the next best document includes selecting relationally-linked documents. For example, in embodiments wherein documents are stored in a hierarchical structure, relationally-linked documents may be parent documents, child documents, and/or sibling documents. The active learning application may order the next best document and its relationally-linked documents according to a pre-determined order. For example, in an email context, when the next best document is an attachment, the relationally-linked parent email (e.g., the message body and headers) may always be served first, followed by the next best document, followed by any other attachments belonging to the relationally-linked parent email. The user may individually code each document according to a relevant/not relevant scoring. When a document is the next document to be served by a queue, the active learning application checks the entire family and documents within the family are ordered for review in accordance with a control number. For example, the control number may start with the parent document (the email) and proceed sequentially through the attachments. Consequently, the traditional linear review experience for families may be preserved.

The concept may be expanded to other types of relational fields beyond family. The user interface 200 includes a family field 204 that allows the user to specify a field on which to group family documents. The user may use the family field 204 to select the relational field on which to group the documents for review. For example, the user may select from the family field 204 to group the documents by email thread/conversation, duplicates, email duplicates, family, near duplicates, clustering, thread groups, etc. The user interface 200 includes a reviewers element 206 that enables the user to select one or more reviewers to review the family documents.

In some embodiments, the relational field selected from the family field 204 may not relate to email. For example, for non-email documents, a user may initiate textual near duplicates detection, wherein documents that are textually similar are grouped (e.g., using a machine learning model or an algorithm). The grouping may include marking one of the documents as a principal document, wherein the remaining documents in the grouping are relational members. In such embodiments, the active learning process may determine the next best document, as above, and then prioritize serving the principal document first, followed by the remaining members in the textual near duplicates grouping.

In yet further embodiments, documents may be grouped according to a clustering algorithm (e.g., K-means). Therefore, the family relationship between documents may be established explicitly, as in email, or implicitly, by a process analyzing the respective documents and creating the relationship. When a clustering algorithm is used to group documents, the clustering is performed ahead of time by a first machine learning model. The first machine learning model separates the documents into a plurality of clusters. Then, the documents are ranked and presented to the user in an active learning application. As the user codes each of the documents in the plurality of clusters, a second machine learning model uses the codes to learn a relevance of each of the documents. In some cases, the active learning process may prioritize each cluster and the user may code each document in a first cluster before moving to a second cluster. Documents may be clustered by any suitable criteria (e.g., document language).

A reviewer may code documents according to a four-corners rule. The four-corners rule stipulates that a document is judged as responsive or non-responsive based solely on whether extracted text of the document only, and not for example, text from related documents. One challenge with presenting related documents to the reviewer may lead to the review classifying the individual document based upon its relation to the related documents (thus violating the "four corners rule"). When these classifications occur, the model is trained incorrectly, impairing the model quality. Accordingly, additional review decisions can be provided to enable the reviewer to indicate the relation-based relevance in manner that does not cause the model to be trained on the decision.

Family-based review in active learning may simulate a workflow that is familiar to more traditional users that are resistant to, or avoid entirely, automated document production. For example, some clients are hesitant to use active learning for document production. Such clients may respond to production requests by saving searches and reviewing all documents, not leveraging the statistical guarantees of active learning and elusion testing to review less than an entire corpus of documents. Such clients may review all documents without regard to the individual relevance of each document. Such clients may review documents by first examining a parent, and then each child in a descending tree order. Therefore, in some embodiments, the addition of family-based review to an active learning context preserves a presentation style that is recognizable to such users, that also advantageously reduces the amount of storage, networking bandwidth, and computation necessary to conduct a family-based review of documents in a prioritized order.

Specifically, family-based review embodiments may determine relevance with respect to every document in a set of families. For example, a machine learning model may analyze each document comprising a first family of documents (e.g., a first email chain having multiple MIME parts and multiple attachments), assigning a respective score to each document in the first family, and each document comprising a second family of documents (e.g., a second email chain having multiple MIME parts and multiple attachments), assigning a respective score to each document in the second family. An active learning process may compute the average score for the first family and the second family, and display the family having the higher score. An average of many document families (e.g., thousands or more) may be computed and ranked in this way, such that the document families having the highest scores are displayed first. The average scores may be weighted in some cases according to the number of documents in each respective family, such that as between two families having an equal average, the family having the greater number of relevant documents would be displayed first.

In some embodiments, an email thread, chain, or conversation may include a plurality of emails organized in one or more branch. The active learning process may display the most relevant email of the conversation (e.g., the fourth email of ten). In some embodiments, the active learning process may display to the user the entire chain from the most relevant email onward, in chronological order. Other types of sorting may be used, in some embodiments.

V. Example Active Learning Application

FIG. 3 depicts an example active learning application 300. The active learning application 300 includes an assisted review tab 302, including a project description user interface 304 providing the user with access to a prioritized review family configuration panel 306 that corresponds to the family-based review user interface 200, in some embodiments. The family prioritized review family configuration panel 306 includes a family field 308 that corresponds to the family field 204 of FIG. 2, and a reviewers interface 308 that corresponds to the reviewers element 206 of FIG. 2, in some embodiments. The family field 308 allows the user to select a relational field on which to group documents in an active learning review process (e.g., the active learning review process depicted in FIG. 1). The reviewers interface 310 allows the user to assign one or more reviewers to the active learning review process. The active learning application 300 also includes an elusion testing interface 312, and a document rank distribution 314 in some embodiments. The elusion testing interface 312 is discussed in further detail, below.

The document rank distribution 314 is a chart that may be displayed during the active learning method 100, according to some embodiments. The document rank distribution 314 depicts the count of documents by relevance, from least relevant (0) to most relevant (100). As noted above, documents of ranking near 50 are queued for display first, in coverage queue review. A relevance rank near zero indicates the trained machine learning model believes the document is more likely coded on the negative review field choice. On the other hand, a rank closer to 100 means the model believes a document is more likely to be coded on the positive review field choice. In the early stages of an Active Learning project, most documents will have a relevance rank score between 40 and 60 until the model begins training. When using a prioritized review queue, documents that the system scores as relevant are served for review first, and the number of relevant documents shown to reviewers decreases. Typically, when the review is completed, or near the completion of the review, a small number of documents are clustered around high and middle relevance ranks, and a large proportion of documents are clustered around low rankings (i.e., non-relevant). In general, users can view the document rank distribution 314 to gain an understanding of the number of predicted, relevant documents that remain for review in the queue, the agreement with respect to relevance of documents between reviewers and the Active Learning model (e.g., whether a ranking corresponds to a coding), and the number of documents the queue does not understand well.

When a reviewer is logged in to the active learning application 300, the reviewer may view a list of documents and individual documents via a document view user interface. In some embodiments, the active reviewer user interface and document view user interface are displayed as pages within the active learning application 300, and/or as dialog windows (e.g., modal dialog windows, X-windows, tabbed windows, etc.).

Figure 4:
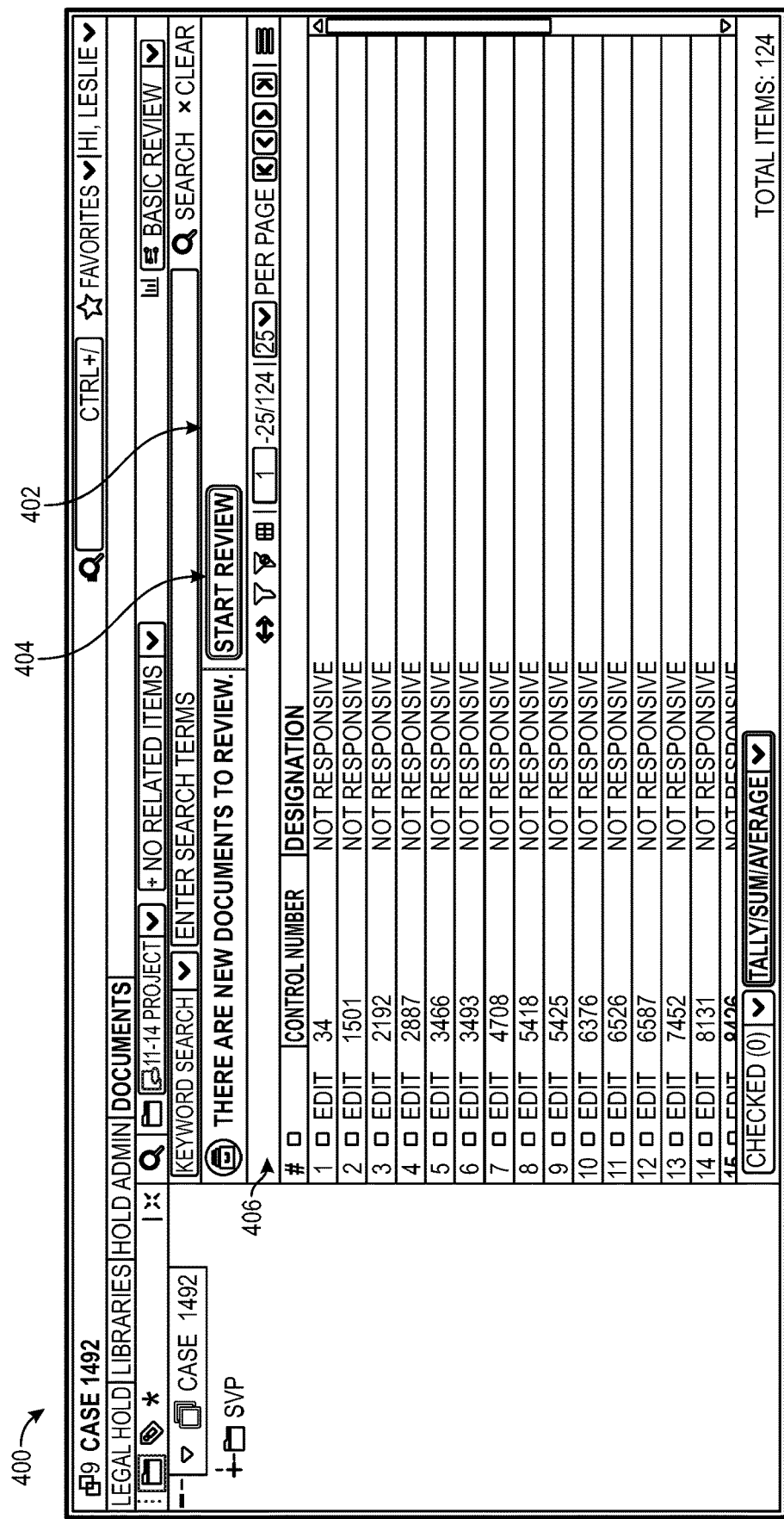
FIG. 4 depicts an active reviewer user interface, according to an embodiment.

FIG. 4 depicts an active reviewer user interface 400. The active reviewer user interface 400 includes a banner 402 including a "Start Review" user interface control 404 and a list of documents 406. When the user selects the user interface control 404, the active learning application 300 begins the review process for the user by displaying a document view user interface to the user. The user may also cause the view user interface to be displayed by selecting one of the list of documents 406. The active learning application 300 may display each of the documents in the list of documents 406 via the view user interface, for example.

Figure 5:
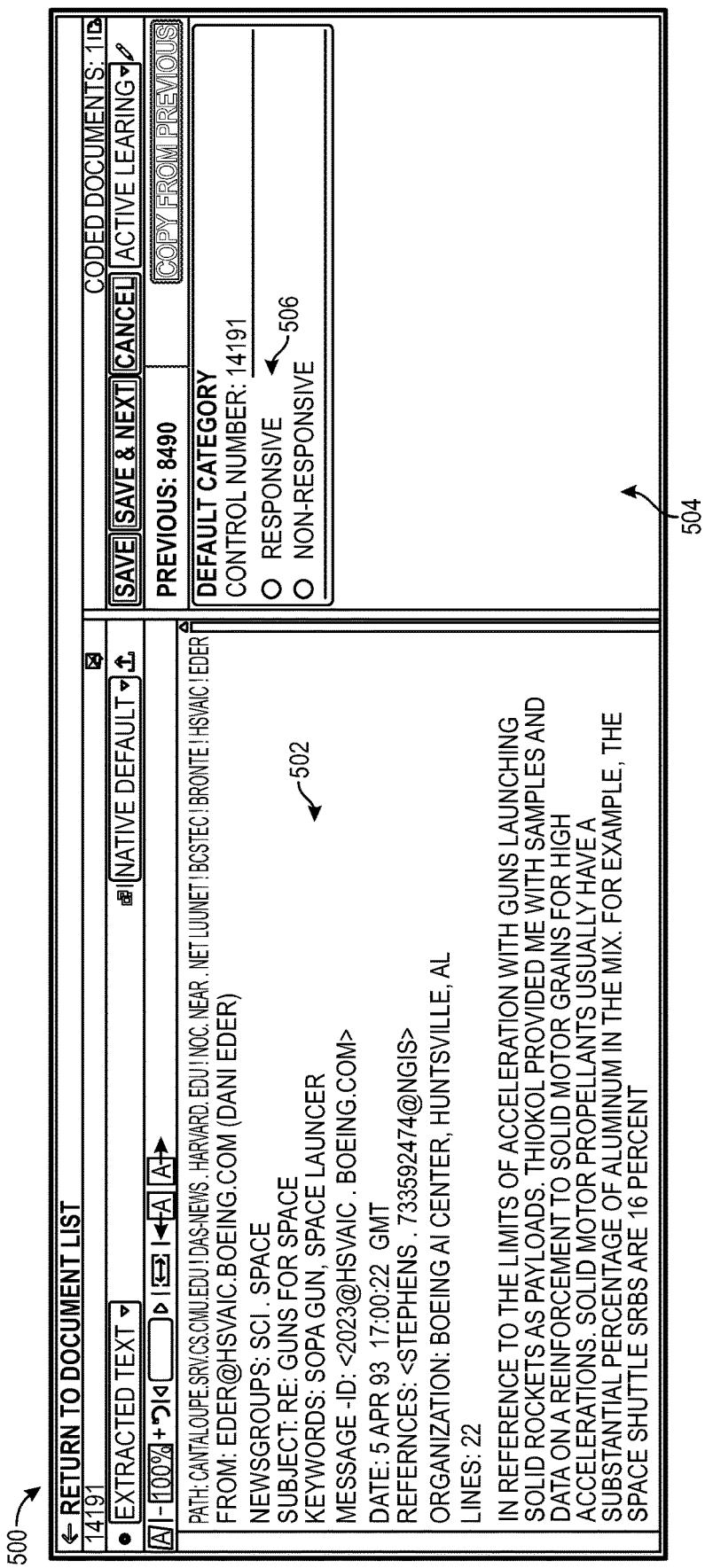
FIG. 5 depicts a document view user interface, according to an embodiment.

FIG. 5 depicts a document view user interface 500, including a payload window 502 and a coding window 504. The payload window 502 includes the content of a document, such as the body of an email, an email attachment, an SMS message, etc. The payload window 502 may include message metadata in some cases, such as email headers, SMS sender/recipient information, one or more timestamp, etc. The coding window 504 allows the user to select from a responsive or non-responsive option 506. The document view user interface 500 is simplified for expository purposes and may be configured differently, in some embodiments. For example, the option 506 may include any number of options (e.g., a multiple-choice of five options). In some embodiments, the user may code a document by selecting more than one option from amongst the options in the option 506. For example, a user may mark a document as positive, neutral or negative with respect to one or more categories, including without limitation, responsive, responsive-fraud, not responsive, not sure, not sure foreign language, not sure needs further review, not sure IT issue, etc.

VI. Example Machine Learning Training and Operation

As the user codes the document displayed in the payload window 502 via selecting the one or more options, the active learning application 300 may transmit the user's selection to a backend (e.g., a server computer). The server computer may analyze the user's selection (e.g., using a trained machine learning model). The machine learning model may select the next document to display (e.g., the next best document) by analyzing the user's selection. The active learning application may receive/retrieve the next best document, and display the next best document in the payload window 502. In some embodiments, selecting the next best document may comprise re-sorting the list of documents 406 according to an ordering output by the trained machine learning model. In some embodiments, the backend may continuously train the machine learning model as the user iteratively codes and views documents in the document view user interface 500. By iteratively coding and viewing the documents, the model becomes more accurate as the user makes ever more relevance (e.g., coding) decisions with respect to a corpus of documents. In some embodiments, a document may be excluded from training, such as when a user codes a document as relevant based on its relationship to another document, rather than on its contents. In such cases, the coding decision would violate the four corners rule. In other cases, a document may be excluded from training until a threshold number of training samples is analyzed (e.g., until the machine learning model has analyzed the first n coded documents). Machine learning is further described, below.

VII. Elusion Testing

Elusion testing is a process whereby users validate and understand the quality of the automatic categorization provided by the machine learning model. In elusion testing, a sample set of documents that are deemed not relevant and have not been reviewed are served in a queue, and reviewed (e.g., coded) by one or more reviewer(s). The remaining relevant documents in the sample set may be used to calculate elusion rates. Elusion is defined as the proportion of non-relevant documents that are relevant (e.g., documents below the rank cutoff). Thus, the elusion rate is the percentage of documents coded relevant in the elusion sample. A lower elusion rate indicates that a project is nearing completion.

In some embodiments, the active learning process (e.g., the method 100) calculates a statistical estimate (e.g., a likelihood) that any relevant documents are included in the sample set of documents. When the estimate reaches or exceeds a predetermined confidence level, the elusion test is completed. When the estimate is lower than the confidence level, the review queue is reopened and the reviewers continue reviewing documents. A predetermined margin of error may also be set. The predetermined confidence level and margin of error may be set by an active learning project administrator, a reviewer, a judicial order, etc. For example, the predetermined confidence level may be set to a 95% certainty of having reviewed all relevant documents, with a margin of error of 2.5%. As discussed above, a relevance rank near zero indicates the model believes the document is more likely coded on the negative review field choice. On the other hand, a rank closer to 100 means the model believes a document is more likely to be coded on the positive review field choice. In the early stages of an Active Learning project, most documents will have a relevance rank score between 40 and 60 until the machine model begins training.

Figure 6A:
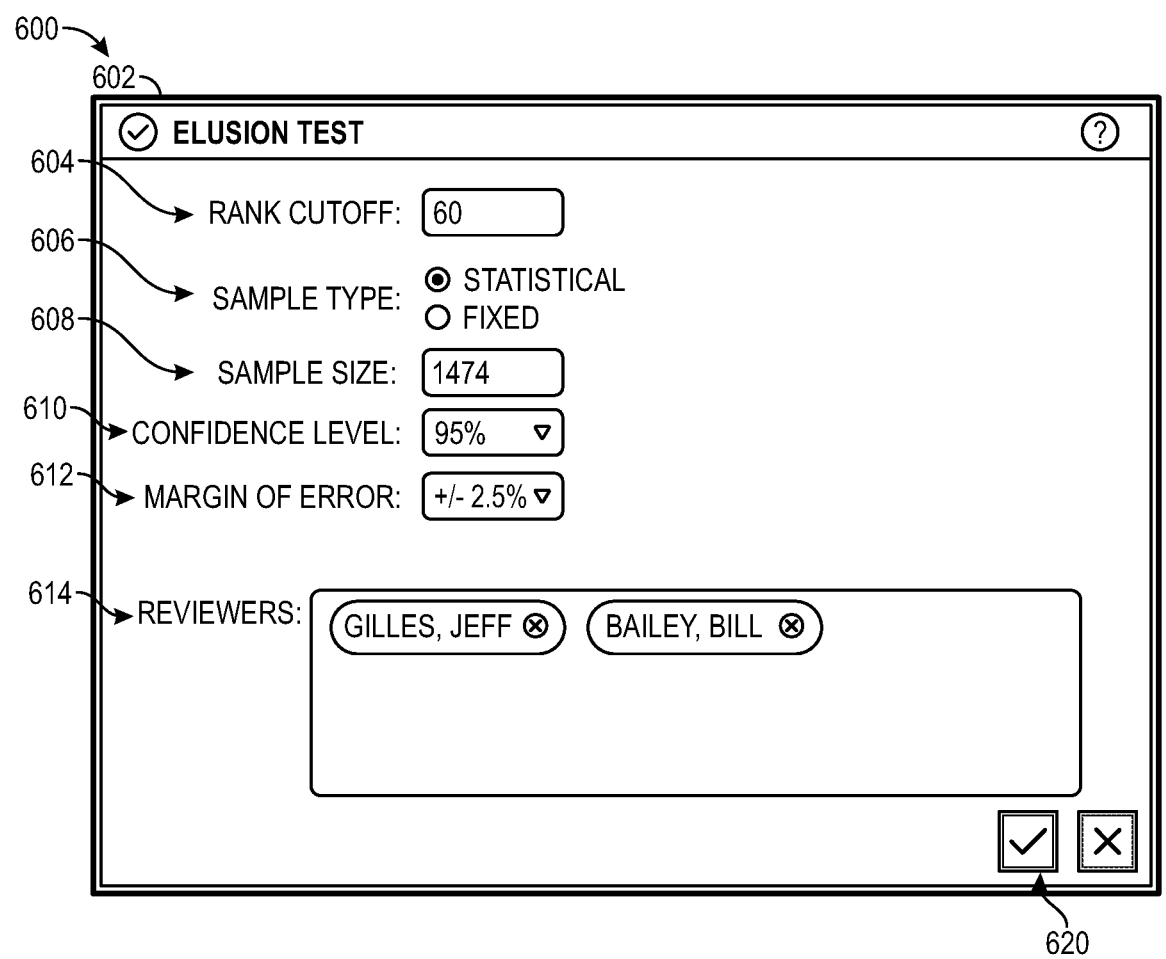
FIG. 6A depicts an example elusion testing user interface, according to an embodiment.

FIG. 6A depicts an example elusion testing user interface 600 that may be displayed in, for example, the active learning application 300 of FIG. 3. In some embodiments, the active learning queues (e.g., the prioritized review queue, the coverage review queue, etc.) may be suspended while the elusion test is running. The elusion testing user interface 600 includes an elusion test parameterization window 602. The elusion test parameterization window 602 includes a rank cutoff user interface control 604, a sample type user interface control 606, a sample size user interface control 608, a confidence level user interface control 610, a margin of error user interface control 612, and a reviewers user interface control 614. Each of the user interface control elements of the elusion test parametrization window 602 allow a user to select and/or input a value, and more or fewer user interface controls may be included in some embodiments. The rank cutoff user interface control 604 is the rank below which the elusion test will sample non-coded, predicted non-relevant documents (e.g., not reviewed, skipped, suppressed duplicates, etc.). The sample type user interface control 606 may be fixed, in which case the elusion test creates a random sample of a fixed number of documents. The sample type user interface control 606 may be statistical, in which case the elusion test creates a random sample set of a size that is based on a given confidence and margin of error. The sample size user interface control 608 is the number of documents that will be sampled. In some cases, the sample size user will be input by the user. In some embodiments, the sample size will be automatically calculated based on the user's selection of a confidence level from the confidence level user interface control 610. Specifically, as the user increases the selected value in the confidence level user interface control 610, the sample size is required to be larger. The user may also select a margin of error from the margin of error user interface control 612. Finally, the reviewer may select/input one or more reviewer in the reviewers user interface control 614. Once the user has parameterized an elusion test via the elusion testing user interface 600, the user may select a check box 620 to cause the elusion test to be initiated (e.g., by causing the parameters to be transmitted to the backend server), and may view the results of the elusion test in an elusion test output user interface.

Figure 6B:
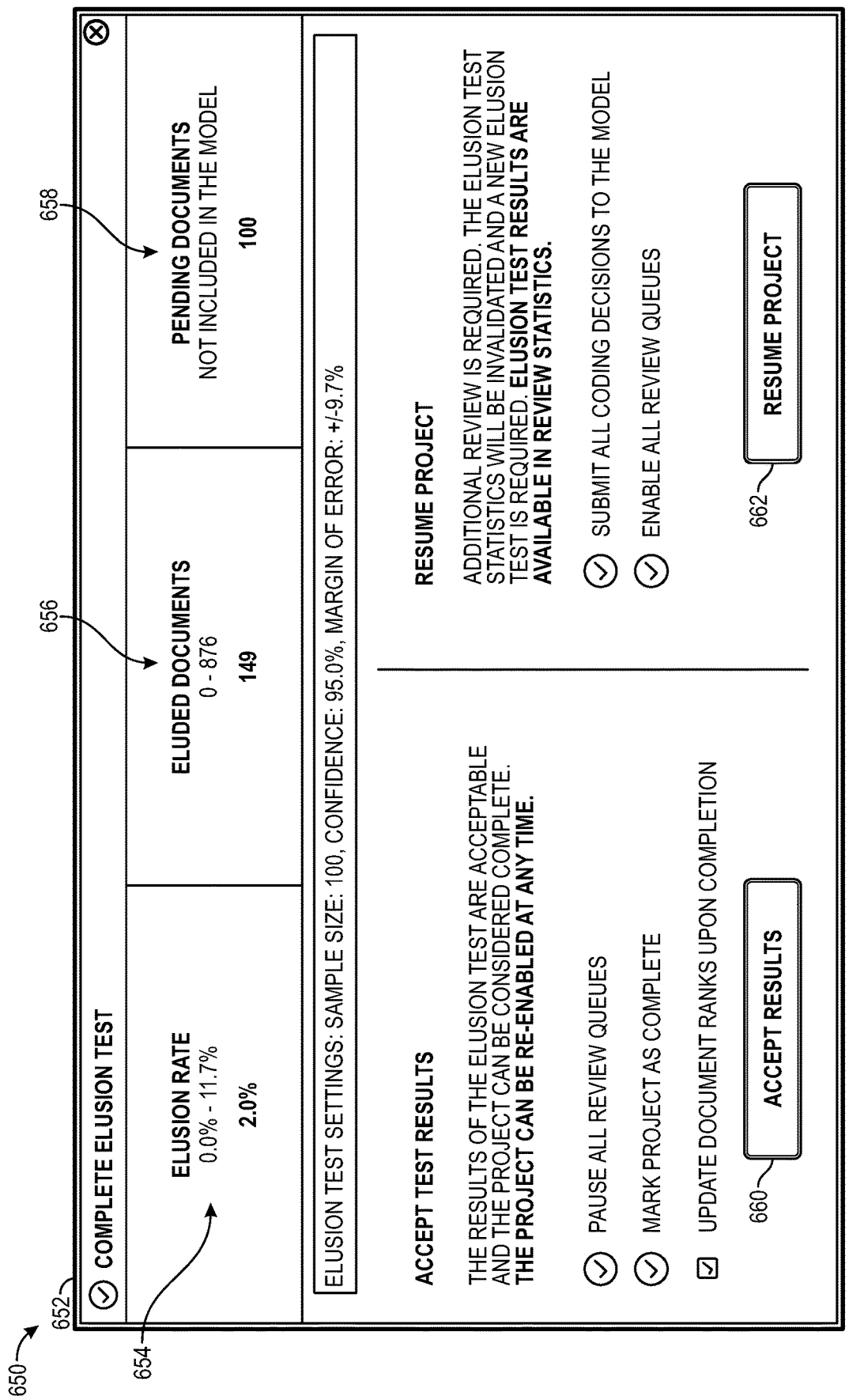
FIG. 6B depicts an elusion test output user interface, according to an embodiment.

FIG. 6B depicts an elusion test output user interface 650. The elusion test output user interface 650 includes an elusion test window 652 that the user may interact with to control the elusion test. The elusion test window 652 includes an elusion rate 654, an eluded documents count 656, a pending documents count 658, an accept results user input control 660, and a resume project user input control 662. The user may view the elusion rate 654, the number of eluded documents 656, and the pending documents count 658 to learn the individual statistics of the elusion test (e.g., an elusion test parameterized by the elusion testing user interface 600). The user may select the accept results user input control 660 to conclude the active learning process. Alternatively, the user may select the resume project user input control 662 to continue the active learning process. The results of the elusion test displayed in the elusion test window 652 may be saved in a database for later reference, and displayed in tabular format (not depicted) so that over time, the user can see the progress of elusion rates, eluded documents, pending documents, etc.

VIII. Example Stopping Point Determination

As noted above, an elusion test is generally run when the project has stabilized and low-ranking documents have an acceptably low relevance rate. However, an elusion test may be run at any point during the active learning process. Thus, before an elusion test can be executed, the user must determine an appropriate stopping point. Doing so is subjective and often difficult. When an elusion test is performed too soon, then the relevance score of many documents will be uncertain, and the elusion test will lack sufficient confidence. When the elusion test is performed too late, then the reviewer may unnecessarily review too many documents. The present techniques include displaying an indication to the user when the active learning process is ready for an elusion test. In some embodiments, the indication is transmitted (e.g., by the backend server) to the user (e.g., via an email, an SMS message, a push notification, etc.).

In an embodiment, an error rate estimation algorithm is used to predict the stopping point. Generally, the error rate estimation algorithm analyzes the last batch of documents, wherein the last batch is a predetermined number of most recently reviewed documents (e.g., 20). In some embodiments the batch of documents may correspond to a set of documents reviewed during a particular time window (e.g., a sampling window). For the last batch, the algorithm counts how many of the documents in the batch were predicted correctly (e.g., a true positive or a true negative) by the trained machine learning model, as opposed to a set of respective actual coding values provided by the reviewers of the documents. When the error rate drops below a predetermined threshold value and remains there for a predetermined number of batches, the algorithm concludes that the model has become sufficiently accurate that the stopping point has been reached, and that the elusion test may be run.

Figure 7:
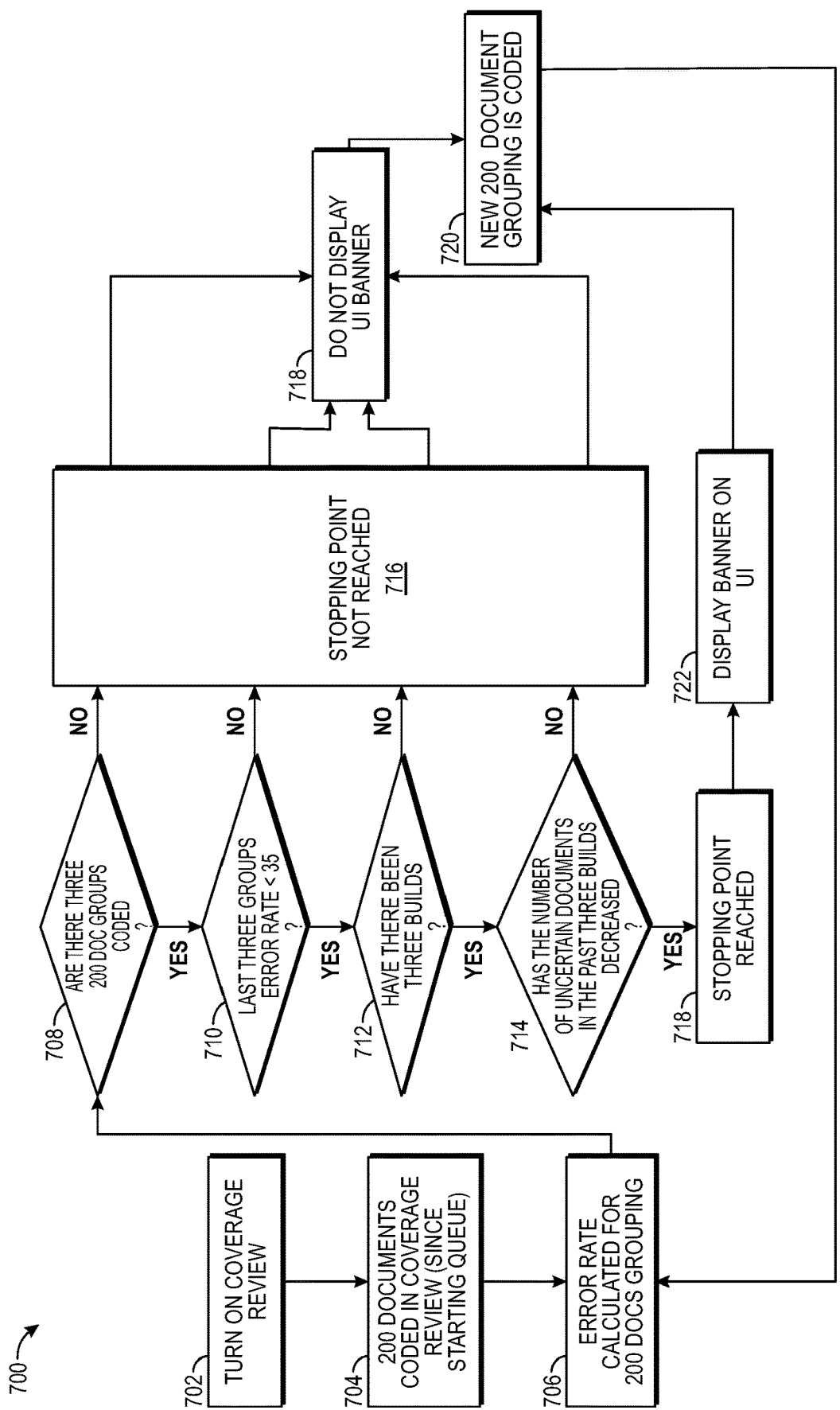
FIG. 7 depicts an example stopping point error rate flow metric method, according to one embodiment and scenario.

FIG. 7 depicts an example stopping point error rate flow metric method 700, according to an embodiment. The method 700 includes enabling review (block 702), such as coverage review. For example, the method may include a server computer collecting a user indication (e.g., from a client device) wherein the indication toggles a coverage review flag. The method 700 includes determining whether a predetermined number of documents (e.g., 200) were coded in the enabled review since the queue was begun (block 704). The method 700 includes calculating an error rate for the predetermined number of documents (block 706). The method 700 includes determining whether a predetermined number of n-document groups (e.g., three 200-document groups) have been coded (block 708). When the predetermined number of n-document groups have not been coded, the method 700 includes determining that the stopping point has not been reached (block 716). When the predetermined number of n-document groups have been coded, the method 700 includes determining whether an error rate of the predetermined number of groups exceeds a predetermined constant (e.g., 35) (block 710). When the error rate of the predetermined number of groups exceeds or equals a predetermined constant, the method 700 includes determining that the stopping point has not been reached (block 716). When the error rate does not exceed the predetermined constant, the method 700 includes determining whether a predetermined number of builds (e.g., three) have occurred (block 712). When the predetermined number of builds have not occurred, the method 700 includes determining that the stopping point has not been reached (block 716). When the predetermined number of builds have occurred, the method 700 includes determining whether the number of uncertain documents in the predetermined number of builds have decreased (block 714). When the number of uncertain documents in the predetermined number of builds have not decreased, the method 700 includes determining that the stopping point has not been reached (block 716). When the number of uncertain documents in the predetermined number of builds have decreased, the method 700 includes determining that the stopping point has been reached (block 718) and causing a user indication (e.g., a banner) to be displayed in a user interface (block 722) and causing a new n-document grouping to be queued for coding by the user (block 720). When the method determines that the stopping point has not been reached at block 716, the method 700 includes not causing an indication to be displayed in an UI, and causing a new n-document grouping to be queued for coding (block 720).

The method 700 is simplified in some ways for ease of explanation. However, the steps may differ in some embodiments. For example, at block 718, when the method 700 determines that the stop point has been reached, the method 700 may include automatically initiating an elusion test, instead of or in addition to causing a user interface indication to be displayed. In yet another embodiment, alerts may be triggered to the project administrator when the stopping point is reached.

Generally, the method 700 depicts a metric that is easily interpreted by a project administrator, depending on the administrator's project needs, to determine when the administrator should stop review and being an elusion test. The metric may be summarized as determining whether an estimated error rate is at or below a configurable target rate, determining whether an estimated error rate has a configurable number of sequential data points at or below the target rate, and determining a number of "uncertain" documents (e.g., rank 40-60) is steady or decreasing over a configurable number of data points. When a rolling load occurs (i.e., the index size changes) then the method 700 may reset the sequential data point count to 0. The error rate metric may be expressed as:

$$\frac{\begin{pmatrix} \text{The number of documents ranked at} \\ \text{or above 50.0 and coded negatively} \end{pmatrix} + \begin{pmatrix} \text{The number of documents that were} \\ \text{ranked below 50.0 and coded positively} \end{pmatrix}}{\text{The number of documents reviewed}}$$

Empirical testing has shown that the error rate may correlate with elusion test results, showing that the error rate is predictive of acceptable results. An intuition underlying the above error rate algorithm is that as the model learns and more documents are coded by human reviewers, the model becomes more accurate. Therefore, future error rate is generally as good or better than the current error rate.

What an administrator considers an acceptable elusion test outcome may vary and be highly dependent on a set of documents. Thus, in some embodiments, it may be desirable to tune the stopping point indication to the detail of the data set. Target recall value tuned to value shooting for, or if it will never reach the value they are targeting, let them know that as well.

IX. Stratified Elusion and Recall Embodiments

Reviewing all documents in the set of documents is one way to achieve a high accuracy result. However, in active learning, a primary goal is to avoid reviewing an entire set, or corpus, of documents for time, computational, and/or economic reasons, especially when review of substantially less than the entire set of documents has an acceptably low elusion rate with high confidence/margin of error. Therefore, at the end of an active learning process, such as the method 100 of FIG. 1, the user may want to validate the review of relevant documents for accuracy. Elusion testing, as described above, is one technique for performing the validation, which quantifies which relevant documents the trained model missed. As discussed above, an hypothetical rank cutoff separating relevant from non-relevant is established, and documents beneath the cutoff that appear to be not relevant are sampled to determine which actually relevant documents eluded the model. The number of relevant documents beneath the cutoff determines the elusion rate. When the elusion rate is high, the user may need to reevaluate the project, and elusion testing is expensive and time-consuming. Forcing the user to guess a rank cutoff at the outset of the elusion test may cause the user to make an expensive mistake. Choosing a different rank cutoff and re-running an elusion test may require the storage, retrieval, processing, and review of many more (e.g., 1000 or more) documents by reviewers.

Figure 8:
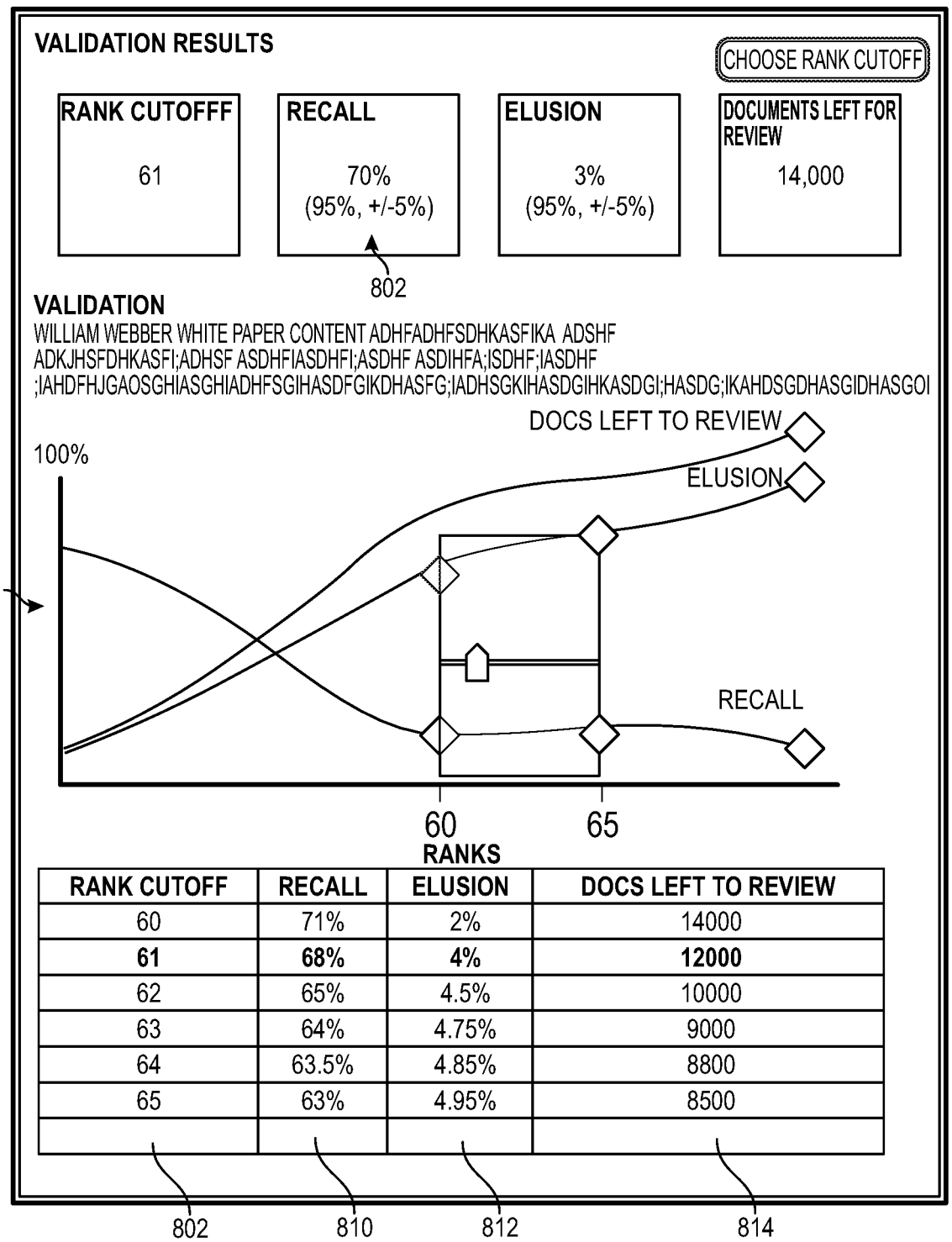
FIG. 8 depicts a validation report that statistically approximates a respective elusion and recall value at a range of hypothetical rank cutoffs, according to an embodiment.

The present techniques include improvements to conventional elusion testing. Specifically, FIG. 8 depicts a validation report 800 that statistically approximates a respective elusion and recall value at a range of hypothetical rank cutoffs 802. To generate the validation report 800, the user supplies a desired confidence and margin of error 804. The user may use the report 800 to reduce the number of documents that are required to be reviewed at the validation stage (e.g., the validating step at block 112 of FIG. 1).

In a coverage review queue, or quick production, workflow, the user reviews documents from the coverage review queue until reaching the stopping point, as described above. For example, rather than serving the highest ranked documents, the queue serves documents in approximately the 45-75 rank. For example, the user reviews documents at rank 50 and human responsive/computer-non responsive documents, and vice versa. The documents at rank 50 may be empty documents or non-empty documents. The documents may be "empty" in that they include content that cannot be evaluated (e.g., an encrypted file, a binary image, etc.). Once the stopping point is reached, the user chooses a fixed sample size or statistical sample size. The user assigns reviewers, who code all of the documents. The administrator then reviews the results, and for each rank cutoff 802 in the unreviewed document space, views and compares the respective elusion 812, recall 810, and uncoded document 814 value. The user references these values, e.g., as they are displayed in the validation report 800, when discussing the matter with opposing counsel and/or other legal team members, and chooses a rank cutoff 802. Reviewers review all coded relevant documents for privilege and family conflicts, when family-based review is disabled). In some embodiments, the model associated with the coverage review queue is frozen.

In a prioritized review queue embodiment, the user reviews documents in a prioritized review queue until the relevance rate drops (e.g., in the active learning application 300 of FIG. 3). As above, the prioritized review queue returns the documents with the highest relevance first to the reviewing user. As the user codes the documents, the user's coding decisions are returned to the model (e.g., a model executing in the backend server). The model incrementally updates and resorts the documents by updated relevance.

The relevance rate is defined as a measure of the percentage of those documents the reviewer is marking as relevant out of the total set of documents served by the prioritized review queue. The user reviews empty documents (e.g., those at rank 50). The user reviews documents that the human marked as responsive that the computer marked as non-responsive and those documents that the human marked non-responsive that the computer marked responsive. To generate a validation sample, an administrator chooses a fixed sample size or statistical sample. Reviewers code all documents and administrators review the results in a validation report (e.g., the validation report 800). The range of hypothetical rank cutoffs 802 are generated using stratified elusion.

Stratified elusion samples the entire unreviewed population at the end of a project, when relevance is understood. Stratified elusion refers to a systematic random sampling algorithm wherein a starting location is pseudo-randomly or randomly chosen, and then the dataset is bucketized (i.e., stratified). The algorithm pulls from each bucket, or strata, until the number of desired samples has been collected. By systematically selecting from strata, the algorithm results in a sample that is representative of all unreviewed remaining documents in the set of documents. The sample is used to calculate for each of the hypothetical rank cutoffs 802 a respective elusion value 810, a respective recall value 812, and a respective number of uncoded documents above each rank cutoff left for review 814. The recall value 812 may be defined as the percentage of documents that the model found out of the number of truthfully relevant documents (e.g., documents coded as relevant by human reviewers). A statistical model may be used to determine recall when the truth (e.g., the coded relevance/non-relevance) of all documents is not known.

An advantage of the present techniques over the conventional methods is that the validation report 800 allows the administrator to view and compare tradeoffs between the respective elusion value 810 and the respective recall value 812 at each of the hypothetical rank cutoffs 802 in real-time, and to also compare the respective uncoded documents left for review 814. For example, the user can view each hypothetical rank cutoff 802 separating relevant from non-relevant documents. The greater each rank cutoff, the fewer documents remain that must be reviewed. However, in general, more documents are eluded (i.e., the elusion rate is higher) and recall suffers as the rank cutoff increases. Assuming a user is negotiating a production agreement with opposing counsel, or discussing a matter with a senior attorney, the user can instantly compare multiple ranges of the hypothetical rank cutoffs 802 side-by-side, along with their associated recall values 810 and/or elusion values 812. The effect that a higher or lower rank cutoff 802 will have on the workload (e.g., the number of documents left to review 814) is immediately apparent to the user. In some embodiments, the validation report 800 may include additional/different columns, such as estimated cost of production for each rank cutoff 802.

Figure 9A:
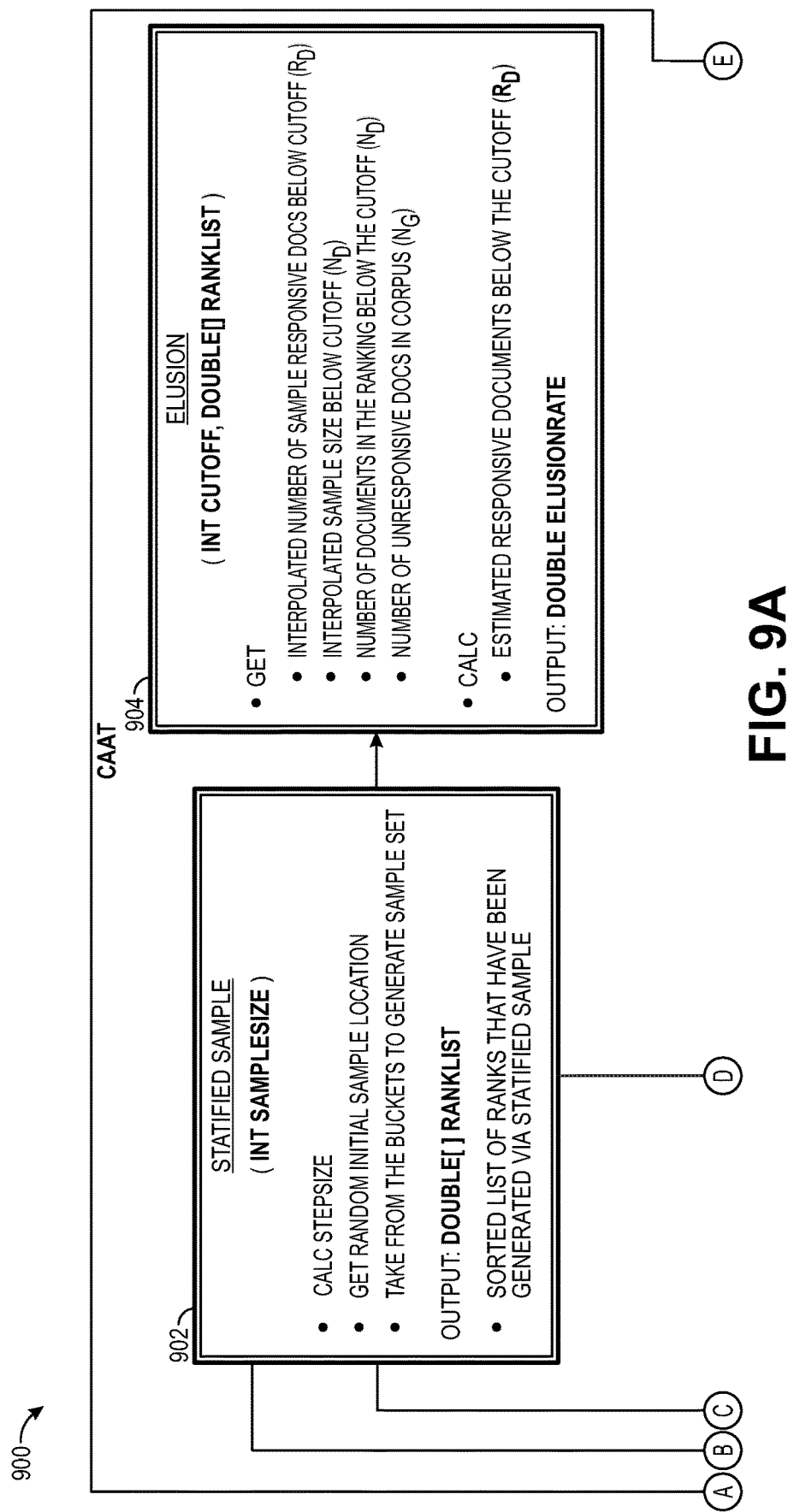
FIG. 9A depicts a function block diagram for stratified elusion testing, according to an embodiment.
Figure 9B:
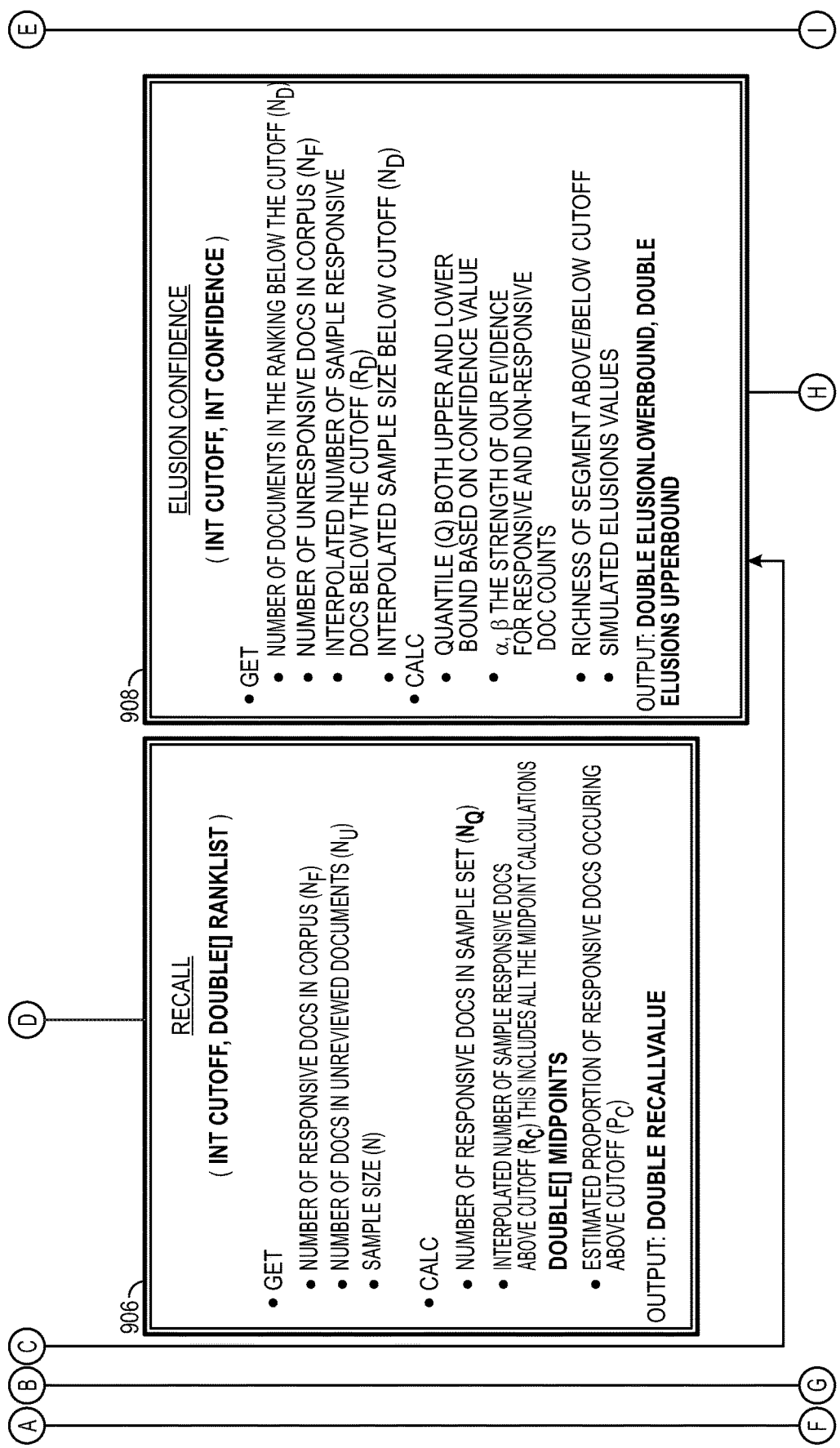
FIG. 9B depicts a function block diagram for stratified elusion testing, according to an embodiment.
Figure 9C:
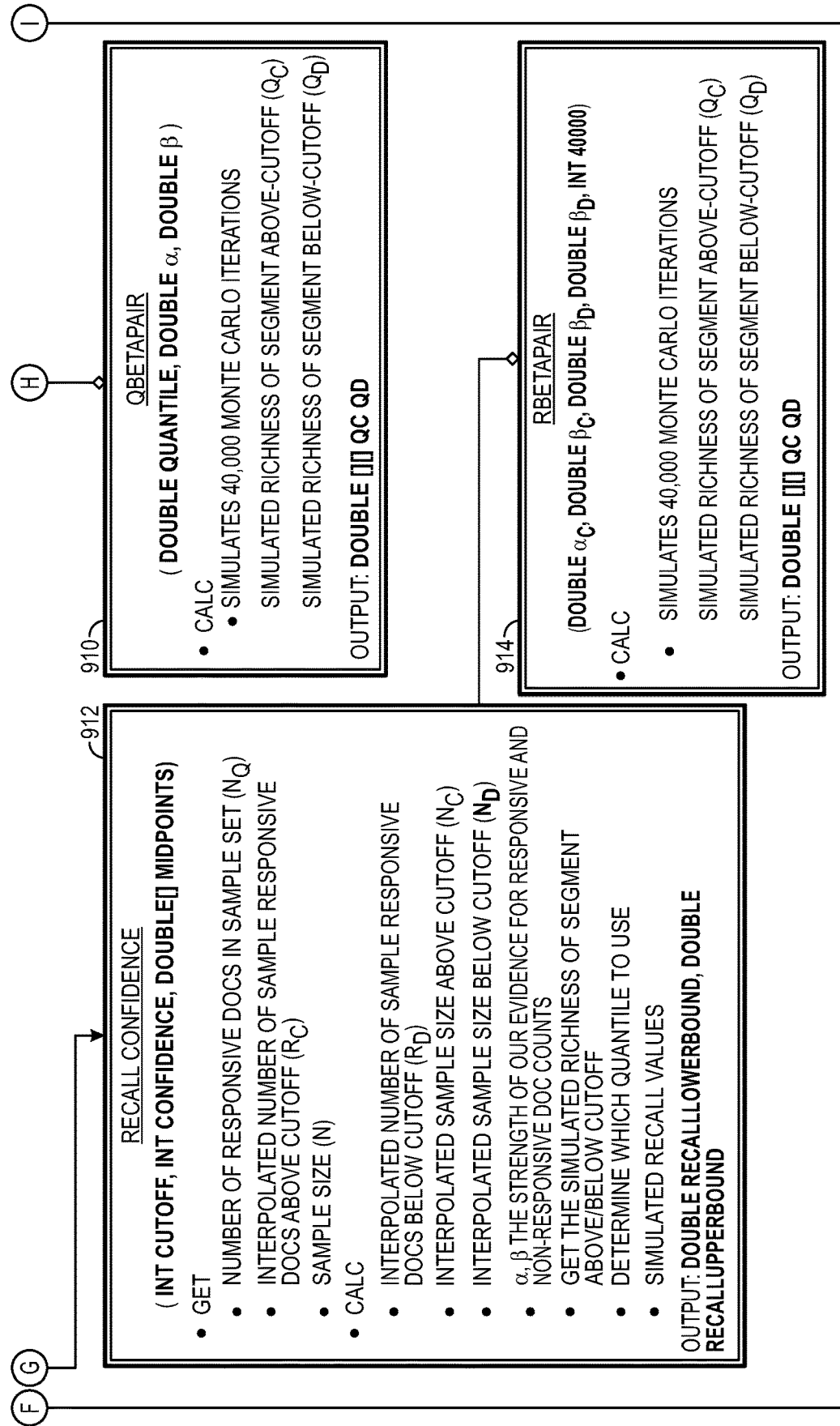
FIG. 9C depicts a function block diagram for stratified elusion testing, according to an embodiment.

FIGS. 9A-9C depicts a function block diagram 900 for stratified elusion testing, according to an embodiment. For example, in an embodiment, the function block diagram 900 may be used to implement executable code that generates the stratified elusion information depicted in the validation report 800. The function block diagram 900 includes a stratified sample function 902 that accepts an integer sampleSize parameter and outputs a double array rankList parameter. The stratified sample function 902 calculates a stepSize and generates a random initialSampleLocation. The stratified sample function 902 bucketizes the ranked document data set, as discussed above, using the step size and initial sample location parameters to determine the size and starting points of the bucketizing, respectively. The stratified sample function 902 returns a double array rankList that is a sorted list of ranks.

The function block diagram 900 includes an elusion function 904 that accepts an integer cutoff parameter and a double array rankList parameter that may correspond to the output of the stratified sample function 902. The elusion function 904 generates an interpolated number of sample responsive documents below the cutoff parameter ($r_d$), an interpolated sample size below the cutoff parameter ($n_d$), a number of documents in the ranking below the cutoff parameter ($N_d$), and a number of unresponsive documents in the corpus ($N_g$). The elusion function 904 calculates a number of estimated documents below the cutoff, and returns a double type elusionRate.

The function block diagram 900 further includes a recall function 906 that takes a cutoff parameter and a double array rankList that may correspond to the double array rankList returned by the stratified sample function 902. The recall function 906 generates a number of responsive documents in the corpus ($N_f$), a number of unreviewed documents ($N_u$), and a sample size. The recall function 906 calculates a number of responsive documents in a sample set ($n_q$), an interpolated number of sample responsive documents above the cutoff parameter ($r_c$) including a double array of midpoints, and an estimated proportion of responsive documents occurring above the cutoff ($p_c$).

The function block diagram 900 further includes an elusion confidence function 908 that takes a cutoff integer parameter, and a confidence integer parameter. The elusion confidence function 908 generates a number of documents in the ranking below the cutoff parameter ($n_d$), a number of unresponsive documents in the corpus ($N_f$), an interpolated number of sample responsive documents below the cutoff parameter ($r_d$), and an interpolated sample size below the cutoff parameter ($n_d$). The elusion confidence function 908 calculates a double quantile value (q), based on the confidence parameter. The elusion confidence function 908 calculates a strength of evidence value for responsive ($\alpha$) and non-responsive ($\beta$) document counts, simulated elusion values, and a richness of segment above ($q_c$) and below ($q_d$) the cutoff parameter. The richness of segment values $q_c$ and $q_d$ are returned by a qBetaPair function 910, which accepts as parameters the double quantile value q, the evidence value for responsive ($\alpha$) and non-responsive ($\beta$) document counts. The qBetaPair function 910 computes simulated richness of segment above-cutoff ($q_c$) and simulated richness of segment below-cutoff ($q_d$). The qBetaPair function 910 returns a two-dimensional double array $q_c$ $q_d$ including the simulated richness of segment above-cutoff and below-cutoff values. The elusion confidence function 908 returns the double elusion lower bound and double elusion upper bound values.

The function block diagram 900 includes a recall confidence function 912 that takes an integer cutoff, an integer confidence, and a double array of midpoints. The double array midpoints may correspond to those computed by the recall function 906. The recall confidence function 912 generates a number of responsive documents in the sample set ($n_q$), an interpolated number of sample responsive documents above the cutoff parameter ($r_c$), and a sample size (n). The recall confidence function 912 computes an interpolated number of sample responsive documents below the cutoff parameter (rd), an interpolated sample size above the cutoff parameter (nc), an interpolated sample size below the cutoff parameter, respective strength of evidence for responsive ($\alpha$) and non-responsive ($\beta$) document counts, and simulated richness of segments above and below the cutoff parameter. The recall confidence function 912 may call an rBetaPair function 914, passing the respective strength of evidence for responsive and non-responsive document counts as double parameters and an integer number of iteration as parameters. The rBetaPair function 914 calculates simulated richness of segment above-cutoff ($q_c$) and simulated richness of segment below-cutoff ($q_d$) by simulating the integer number of iteration Monte Carlo iterations. The rBetaPair function 914 returns a double two-dimensional array of the simulated richness values. The recall confidence function 912 determines which quantile values to use, and which simulated recall values to use, and returns a double recallLowerBound and double recallUpperBound.

X. Prioritized Review Queue Mixture Update

Stopping point may be used in the prioritized review queue, as discussed above with respect to FIG. 1 and FIG. 8. Specifically, stopping point may be used to enable or disable mixing in of a sliver of index health documents that are streamed into the prioritized review queue. That is, in some embodiments, the prioritized review queue comprises the highest-ranked relevance documents, in addition to a sliver of randomly-selected documents. By inserting documents randomly or pseudo-randomly into the highest-ranked relevance display, the prioritized review queue is able to suppress biasing the model based on the results of user coding only highly-ranked documents.

In an embodiment, the prioritized review queue comprises 70% highly ranked documents, 20% uncertain documents, and 10% random documents. The 20% uncertain and the 10% random are built in to ensure overall model health (e.g., Index Health documents). However as the model is sufficiently trained, there is no value in continuing to serve up these 30% "health documents." Thus, reviewing model health documents as the project matures serves little purpose and may cause inefficiencies by causing reviewers to unnecessarily review non-responsive documents. Therefore, once the model appears to have stabilized, the present techniques begin to omit health documents, and to focus on the highest-ranked documents.

In an embodiment, the present techniques analyze the error rate metric, as discussed above with respect to stopping point calculations in conjunction with FIG. 7. When the error rate indicates that a stopping point has been reached, the present techniques determine that the model is healthy and the 30% model health documents mixture into the prioritized review queue is disabled.

In another embodiment, a corpus of 100% highly ranked documents are served to the reviewer(s) once an error rate criterion and an uncertain document criterion are met. The error rate is calculated across the index health 10% random documents, in contrast to the stopping point error rate discussed above, which is calculated with respect to all documents. As above, the relevant condition is that the calculated error rate for the most recent groups is 35% or below and the default group size is 200. However, as above, these values are configurable. The uncertain documents criterion refers to documents having a ranking of 40-60, of the 0-100 relevance scale, and the relevant condition is that the number of recently reviewed uncertain documents decreased over the prior three successful index builds. In some embodiments, the stopping point and queue mixture logic is adjusted at, and local to, the queue level. In other words, the logic is only calculated in the prioritized review queue, and for documents that are reviewed in the prioritized review queue.

In some embodiments, certain events (e.g., removal of documents from the prioritized review queue) may cause the prioritized review queue to recompute the error rate. When the recomputed error rate is greater than the predefined threshold (e.g., 35%), the present techniques may re-enable a 70-20-10 mix including health documents until the error rate once again descends to beneath the predetermined threshold. Similarly, when documents are added, the health documents may once again be mixed in, and the user may be required to code the predetermined n-document group of documents before the error rate is reevaluated. Family-based review may be used in the prioritized review queue, and in such embodiments, documents that are not highest relevance primary documents but documents reviewed due to a relation to a highest relevance primary document may not be counted toward the error rate calculation.

In an embodiment, the prioritized review queue may include a metric for determining how many documents the reviewer must review before the mixture of health documents into the queue is disabled. The metric may be the average number of documents reviewed when the prioritized review queue error rate is met. Specifically, the present techniques may include keeping track of the number of documents that are reviewed when the prioritized review queue mixture is disabled, and exclusively highly ranked documents are served to the reviewer on an historic basis. Over time, the average becomes more accurate.

XI. Additional Embodiments

In an embodiment, a control set may be used to determine the stopping point. A control set is a random sample taken at the beginning of a project, and isolated from the project. The control set is monitored for recall throughout the project, or at the end.

Drawbacks to control set embodiments include the fact that 1) new documents may be added that are not included in the control set and/or 2) relevance may not be well-understood, such that relevance drifts over time, resulting in an outdated and outmoded relevance.

In a transfer learning embodiment, the user creates an index based on a past model. The user performs the validation sample and views the results. If the results are not acceptable, the user proceeds to apply the prioritized review queue embodiment or the covered review queue embodiment, using the index.

Combined with the automated stopping point algorithm described above, the stratified elusion computation is far more efficient that conventional methods. Rather than a user wondering when to run an elusion test, the user is notified when to run an elusion test. Also, the user only runs the elusion test once and configures the rank cutoff after the elusion test.

In an embodiment, recall and elusion are computed at all rank cutoffs from 0 to 100, wherein there are documents represented at each respective rank. The user may drag the region left or right to cause additional ranks outside of the depicted range to be displayed, along with the respective recall, elusion, and remaining document counts at each of the additional ranks. Some ranks may have a zero unreviewed document count, and at those ranks, no recall or elusion values are computed, or a conservative default value is used.

The recall and elusion computations in the validation report 800 may be computationally expensive. Three target parameters drive the generation of the validation report 800: 1) the user's desired confidence 802, 2) the user's desired cutoff, and 3) the user's desired recall. In some embodiments, a report generation module (e.g., stored in a memory of the backend server) may assume that the user desires 95% confidence. In some cases, a subset of target ranks are calculated and their respective recall and elusion values cached, to avoid computing the respective values at each rank. When the user's target parameters change to values outside the computed range, the report generation module may compute the respective values on demand.

In an embodiment, the validation report 800 includes a user interface wherein the user may enter a desired recall, and a corresponding rank cutoff is automatically calculated and displayed (e.g., a rank cutoff calculator parameterized by a recall value). Similarly, the user may drag vertical user interface controls (e.g., two sliders) in a graph 804 to set a range of the hypothetical rank cutoffs 802, and an inner slider to set the selected rank cutoff value.

XII. Example Computing Environment

Figure 10:
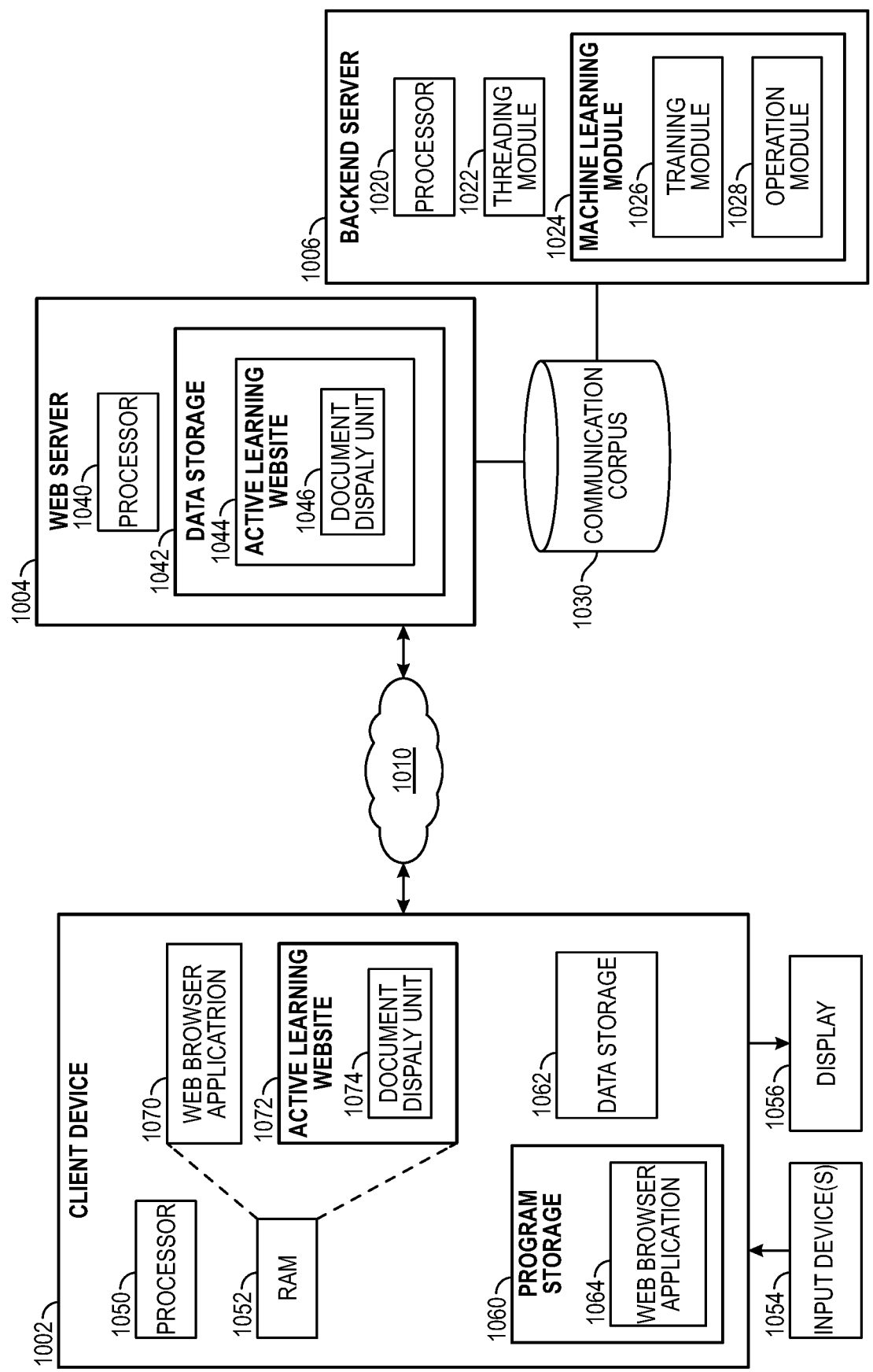
FIG. 10 depicts an example environment in which techniques for active learning methods and systems may be implemented, according to an embodiment.

FIG. 10 depicts an example environment 1000 that may be used to implement the embodiments discussed in FIG. 1 through FIG. 9. The environment 1000 includes a client device 1002, a web server 1004, and a backend server 1006. The client device 1002 is communicatively coupled to the web server 1004 via a network 1010. The network 1010 may be a single communication network, or may include multiple communication networks of one or more types (e.g., one or more wired and/or wireless local area networks (LANs), and/or one or more wired and/or wireless wide area networks (WANs) such as the Internet). The web server 1004 may be remote from or co-located with the backend server 1006. The web server 1004 and the backend server 1006 may each be an individual server, or may each include a group of multiple servers. Alternatively, the web server 1004 and the backend server 1006 may be combined in a single server.

Generally, the web server 1004 hosts web services relating to electronic document review, which may be accessed/utilized by the client device 1002, and the backend server 1006 implements certain back-end operations (e.g., model training, coding analysis, document grouping/family construction, queue construction, elusion testing, error rate calculation, document ranking, etc.) in support of the document review services provided to client device 1002. While FIG. 10 shows only a single client device 1002, it is understood that multiple different client devices (of different entities and/or users), each similar to the client device 1002, may be in remote communication with the web server 1004 and/or the backend server 1006.

The backend server 1006 includes a processor 1020. While referred to in the singular, processor 1020 may include any suitable number of processors of one or more types (e.g., one or more microprocessors, etc.). Generally, processor 1020 is configured to execute software instructions stored in one or more memories (e.g., stored in a persistent memory such as a hard drive or solid state memory) of the backend server 1006. The software instructions, when executed by the processor 1020, implement a threading module 1022, and a machine learning module 1024. The machine learning module 1024 includes a training module 1026 and an operation module 1028.

The threading module 1022 groups documents (e.g., emails) according to a field. For example, when the user selects the family field 204 in FIG. 2, the user selection may be transmitted (e.g., by the web browser application 1070 of FIG. 1) to the web server 1004. The web server 1004 may store the user selection in the communication corpus 1030 as metadata for an active learning request that is associated with the user's account, and/or a particular review queue (e.g., a prioritized review queue). When the user visits the particular queue, the web browser application 1070 may retrieve a set of documents from the communication corpus 1030 that are grouped according to the user selection. The threading module 1022 may asynchronously group documents. For example, the threading module 1022 may create groupings of documents and generate grouping metadata while the user is not accessing the web server 1004 or the backend server 1006. The threading module 1022 may store the grouping metadata in the communication corpus 1030.

The communication corpus 1030 may be stored in one or more persistent memories. In some embodiments, the communication corpus 1030 is stored in locations distributed across a large geographic area. Electronic communication documents in the communication corpus 1030 may be created, retrieved, updated, and deleted by the backend server 1006, the web server 104 and/or the client device 1002. In some embodiments, the communication corpus 1030 is implemented using a relational database management system (RDBMS) such as MySQL, PostgreSQL, Oracle, etc. Document metadata may be stored in communication corpus 1036 in association with the appropriate documents, or in another suitable corpus or database, for example.

The machine learning module 1024 may include instructions for creating, retrieving, and storing machine learning modules. For example, the machine learning module 1024 may include open source library code (e.g., TensorFlow) for managing the setup and scaffolding of machine learning modules. The machine learning module 1024 may include instructions for serializing and deserializing modules. The training module 1026 may include instructions for training a model created/retrieved by the machine learning module 1024. For example, the training module 1026 may include instructions for incrementally training a machine learning module (i.e., online training instructions). The operation module 1028 may include a mechanism (e.g., an application programming interface (API)) accessible by the web server 1004 that allows the web server to submit a document coding, a model parameter, and a document identifier. The operation module 1028 may include instructions for validating the API call to confirm that a model corresponding to the model parameter exists, and for passing a handle to the model, the document coding, and the document identifier to the training module 1026. The training module 1026 may include instructions for training the model corresponding to the model parameter using the document coding and/or the document identifier. For example, the model training module 1026 may adjust weights of a machine learning model such as an artificial neural network based on the document coding and/or the document identifier. The machine learning module 1024 may include callbacks for regenerating one or more document rankings and for sending a response to the web server 1004 after the incremental training is completed, wherein the response includes the regenerated document rankings. In this way, the web server 1004 can submit the document coding, the model parameter, and/or the document identifier, and receive an updated set of rankings in return, wherein each of the updated set of rankings corresponds to a document in the communication corpus 1030 (or to a subset thereof).

The machine learning module 1024 may include computer-executable instructions for training one or more machine learning model using coding decisions of the user. In general, the machine learning module may train one or more machine learning models by establishing a network architecture, or topology, and adding layers that may be associated with one or more activation functions (e.g., a rectified linear unit, softmax, etc.), loss functions and/or optimization functions. One or more types of artificial neural networks may be employed, including without limitation, recurrent neural networks, convolutional neural networks, and/or deep learning neural networks. Data sets used to train the artificial neural network(s) may be divided into training, validation, and testing subsets, and these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values. In an embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction. In another embodiment, a Bayesian model may be used to train the machine learning model.

In an embodiment, the one or more machine learning models may include an artificial neural network having an input layer, one or more hidden layers, and an output layer. Each of the layers in the artificial neural network may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of artificial neural networks are possible. In an embodiment, the input layer may correspond to input parameters that are given as full documents, or that are separated according to word or character (e.g., fixed width) limits. The input layer may correspond to a large number of input parameters (e.g., one million inputs), in some embodiments, and may be analyzed serially or in parallel. Further, various neurons and/or neuron connections within the artificial neural network may be initialized with any number of weights and/or other training parameters. Each of the neurons in the hidden layers may analyze one or more of the input parameters from the input layer, and/or one or more outputs from a previous one or more of the hidden layers, to generate a decision or other output. The output layer may include one or more outputs, each indicating a prediction. In some embodiments and/or scenarios, the output layer includes only a single output.

Once the machine learning model is trained, a module (e.g., the machine learning operation 1028) may load the trained model and receive/retrieve a coding decision, along with a document identifier as input. The machine learning operation module 1028 may apply the coding decision and document identifier to the trained model, to modify the model's training parameters. As the model is provided with more training inputs, the model learns to correctly predict coding decisions for de novo documents.

The web server 1004 includes a processor 1040. As with the processor 1020, the processor 1040 may include any suitable number of processors and/or processor types. Generally, the processor 1040 is configured to execute software instructions stored in one or more memories (e.g., stored in a persistent memory such as a hard drive or solid state memory) of the web server 1004. The web server 1004 also includes a data storage 1042 (e.g., one or more persistent memories) that stores one or more web pages of an active learning website 1044. The active learning website 1044 may include instructions of the web pages (e.g., HyperText Markup Language (HTML) instructions, JavaScript instructions, JavaServer Pages (JSP) instructions, and/or any other type of instructions suitable for defining the content and presentation of the web page(s)), and/or may include instructions of a plug-in, extension, and/or stand-alone software component that may be downloaded by client device 1002. For example, in some embodiments, the active learning website 1044 may be implemented as a mobile telephone application (e.g., an iPhone or Android application, a tablet application, etc.). The active learning website 1044, or another application or unit of the web server 1004 that is not shown in FIG. 10, may also include instructions for communicating with the communication corpus 1030 (and possibly another corpus/database including metadata) as needed to obtain or modify the data stored therein. In other embodiments, the web server 104 accesses the communication corpus 1030 only indirectly, such as through backend server 1006 (e.g., by sending requests for data to the backend server 1006) or another server.

Generally, the active learning website 1044 provides users accessing the active learning website 1044 with a browser-based user interface that enables the review of documents in the communication corpus 1036. To this end, the active learning website 144 may include instructions of a document display unit 1046 that enables a user to review the content of specific, selected documents via his or her web browser. The active learning website 144 may also include instructions configured to recognize various inputs from users, and to act accordingly (e.g., to download and/or display another document in response to the user selecting the document, and/or to save user tags/designations for documents to communication corpus 1030, etc.).

The client device 1002 may be a laptop computer, a desktop computer, a tablet, a smartphone, or any other suitable type of computing device. In the embodiment of FIG. 10, the client device 1002 includes a processor 1050, a random-access memory (RAM) 1052, one or more input devices 1054, a display 1056, a program storage 1060, and a data storage 1062. As with the processor 1020 and the processor 1040, the processor 1050 may include any suitable number of processors and/or processor types. The processor 150 may include one or more microprocessors (e.g., one or more central processing units (CPUs) and one or more graphics processing units (GPUs)), for example. Generally, the processor 150 is configured to execute software instructions stored in the program storage 160. The program storage 160 may include one or more persistent memories (e.g., a hard drive and/or solid state memory), and stores a number of applications including a web browser application 1064. The data storage 1062 may also include one or more persistent memories, and generally stores data used by applications stored in the program storage 1060. For example, the data storage 1062 may store local copies of electronic communication documents that were downloaded from the communication corpus 1030 via the web server 1004.

The input device(s) 1054 may include components that are integral to the client device 1002, and/or exterior components that are communicatively coupled to the client device 1002, to enable the client device 1002 to accept inputs from the user. For example, the input device(s) 1054 may include a mouse, a keyboard, a trackball device, a microphone, etc. The display 1056 may also be either integral or external to client device 1002, and may use any suitable display technology (e.g., LED, OLED, LCD, etc.). In some embodiments, the input device(s) 1054 and display 1056 are integrated, such as in a touchscreen display. Generally, the input device(s) 1054 and display 1056 combine to enable a user to interact with user interfaces provided by the client device 1002.

The RAM 1052 stores portions of the instructions and data stored by the program storage 1060 and the data storage 1062 when the processor 1050 executes applications stored in the program storage 1060. When the processor 1050 executes web browser application 1064, for example, the RAM 1052 may temporarily store the instructions and data required for its execution. In FIG. 10, the web browser application 1064 (while being executed) is represented in the program space of the RAM 1052 as a web browser application 1070. When the user of the client device 1002 uses the web browser application 1064 to access the active learning website 1044, any scripts or other instructions of the active learning website 1044 (e.g., instructions associated with the document display unit 146) may be stored as a local copy in the RAM 1052. FIG. 10 illustrates a scenario where the active learning website 1044 is stored in the RAM 1052 as the active learning website 1072, the document display unit 1046 is stored in the RAM 1052 as the document display unit 1074. The web browser application 1070 may interpret the instructions of each of the local copies to present the page(s) of active learning website 1044 to the user, and to handle user interactions with the page(s) as discussed further below. When various functions or actions are attributed herein to the active learning website 1072 or the document display unit 1074, it is understood that those actions may be viewed as being caused by the web server 1004, by way of providing the instructions of the active learning website 1044 or the document display unit 1046, respectively, to the client device 1002 via the network 1010.

In operation, the user of the client device 1002, by operating the input device(s) 1054 and the viewing display 1056, opens the web browser application 1064 to access the active learning website 1044 for purposes of configuring an active learning process, reviewing and coding electronic documents (e.g., an email message, an email attachment, an email body, etc.) in the active learning process, and validating/testing the active learning process. To fully access the active learning website 1044, the user may be required to satisfy certain security measures, such as entering a valid login and password, for example. The user may then utilize a web page of the active learning website 1044 to indicate the project or workspace that he or she wishes to access. The web server 1004 may use the indication of the project or workspace to identify the appropriate set of documents in the communication corpus 1030, and/or to identify the entirety of the communication corpus 1030 (e.g., if the corpus 1030 only includes electronic communication documents for a single project or workspace).

The user may be one of several user types. For example, with respect to FIG. 1, the user may be an administrative user who accesses the project setup step at block 102. The user may select one or more family-based review options as depicted in FIG. 2, and/or parameterize an elusion test as depicted in FIG. 6A. The user may be a reviewer who clicks the "start review" use interface control 404, as in FIG. 4, to being reviewing documents in an active learning application (e.g., via a prioritized review queue or a coverage review queue). The user may be a result viewer, wherein the user is a client of an administrator, or a coworker of an administrator, wherein the user merely views the results of a validated active learning process (e.g., as in the block 112 of FIG. 1 and/or the validation report 800 of FIG. 8). In some embodiments, the administrative user and the result viewing user may be the same user. For example, the user may reconfigure or administer the active learning process based on the results of the validation/elusion testing.

By the time the user of the client device 1002 accesses the active learning website 1044, the documents in the communication corpus 1030 may already have been pre-processed by the backend server 1006. For example, the threading module 1022 and the machine learning module 1024 of the backend server 1006 may have previously generated one or more grouped document sets (e.g., family document groups), and may have stored metadata indicative of those relationships in communication corpus 1030 or another database. The training module 1026 of FIG. 10 may have analyzed only a few documents, under user supervision to provide an initial training set or "seed" of the trained model. The behavior for further training of the model may be governed by the queue type that is configured by a user and/or selected by the user. For example, if the user chooses a prioritized review queue, then the active learning website 1044 may retrieve and display those documents that the trained module 1026 marks as most relevant. In other types, the labeling, retrieval and display of documents may follow a different strategy, as discussed above.

The coding decisions of the user may be received as user inputs via the input device 1054, for example. The client device 1002 may associate a coding decision of the user with a document and/or document family, and transmit the coding decision and an identifier of the document/family to the web server 1004. The web server 1004 may transmit the coding decision and document identifier to the machine learning module 1024, wherein the training module 1028 further trains one or more model based on the coding decision. The further training may include the operation module 1028 reloading the trained model and/or training the model online (e.g., incremental model training). The user's coding decisions may be stored in the communication corpus 1030, and later used to train a model offline.

In an embodiment, when the user of client device 102 selects a specific electronic communication document (e.g., from a list of document identifiers presented by EDR website 172, and each corresponding to a document in communication corpus 136), web server 104 retrieves the electronic communication document from communication corpus 136, along with associated metadata indicating family-related information. In some embodiments, the selected electronic communication document may be and its related family documents may be lazily loaded, so that the related family documents are only loaded when the user selects the respective family documents (e.g., by selecting "next" or navigating to the family document(s) via a graphical user interface menu). Family documents may be presented to the user via any suitable means, such as via a threaded/tree browsing window. The user's selection of a document may cause a document identifier to be transmitted from the client 104 to the web server 1004, wherein the active learning website 1044 may select one or more documents from the communication corpus 1030 corresponding to the transmitted document identifier. For example document id=1024 may correspond to an email body, wherein the email body includes several attachments 1024.1, 1024.2, . . . 1024.N.

When the user runs an elusion test, the parameters set by the user (e.g., the parameters input into the parameterization window 602 of FIG. 6) may be stored in the communication corpus 1030 and loaded at a subsequent time. The results of the elusion test may also be stored, along with a timestamp, such that the user is able to view a list of respective elusion test parameters and elusion test results in chronological order. This list aids the user in comparing the status of the document coding over time. When the user chooses to initiate the elusion test, the queues belonging to the project may be suspended, so that users are unable to make further coding decisions. Any users currently using the queues may be temporarily logged out, or their accounts disabled.

In some embodiments, a user can code the electronic communication documents that he or she is reviewing according to certain predefined and/or user-created tags/designations, such as "privilege," "no privilege," "responsive," "not responsive," and so on. In some embodiments, user changes to the designations for an electronic communication document are communicated to web server 1004, which modifies the document designation appropriately (e.g., within communication corpus 1030 or another location, depending upon where such data is stored). Web server 1004 may directly modify the designation, or may request that another device or system (e.g., the backend server 1006) do so.

While FIG. 10 shows an embodiment in which an electronic document review tool is provided as a web-based service, it is understood that other embodiments are also possible. For example, the program storage 1060 of the client device 1002 may store a software product that enables the client device 1002 to interface directly with the backend server 1006, without requiring the web server 1004, or to interface with another server (not shown in FIG. 10) that acts as an intermediary between the backend server 1006 and any client devices. In still another embodiment, a software product installed at the client device 1002 may enable the client device 1002 to directly implement the functions of the backend server 106.

Moreover, the various components of the environment 1000 may interoperate in a manner that is different than that described above, and/or the environment may include additional components not shown in FIG. 10. For example, an additional platform/server may act as an interface between the web server 1004 and the backend server 1006, and may perform various operations associated with providing the queue viewing, machine learning, and/or other services of backend server 1006 to the web server 1004 and/or other web servers.

XIII. Exemplary Methods

Figure 11:
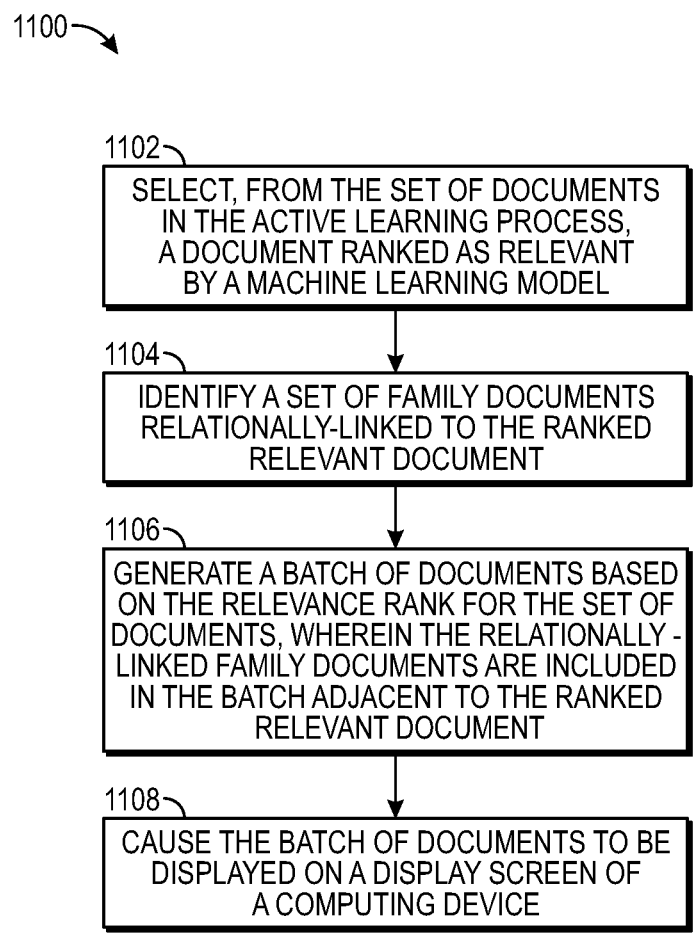
FIG. 11 depicts a block diagram of an exemplary method for conducting family-based review of a set of documents in an active learning process, according to one embodiment and scenario.

FIG. 11 depicts a block diagram of an exemplary method 1100 for conducting family-based review of a set of documents in an active learning process. The method 1100 includes selecting, from the set of documents in the active learning process, a document ranked as relevant by a machine learning model (block 1102). For example, the user may have set up an active learning process such as the process 100 depicted in FIG. 1. In doing so the user may have selected that the set of documents be grouped by conversation, as depicted in FIG. 2, and added one or more reviewers. The one or more reviewers may start review of the set of documents as depicted in FIG. 4. An active learning application, such as the active learning application 300 may display a root document (e.g., an email body) to the user (e.g., in the payload window 502 of FIG. 5). The active learning process may select the root document based on the document being of the highest ranked relevance (e.g., in a prioritized review queue) or based on the document being ranked within a lower and upper bound (e.g., ranked between 40 and 60).

The method 1100 includes identifying a set of family documents relationally-linked to the ranked relevant document (block 1104). For example, in some embodiments, before the user uses the active learning application, a background process executing in the backend server (e.g., the threading module 1022) creates a mapping (e.g., a family relation) between documents. The family relation may be a one-to-one, one-to-many, and/or many-to-many relation. In other embodiments, the family relation is created in real time (e.g., when the user selects a document). In either case, the family relation may be cached as metadata in the communication corpus 1030 for later retrieval. For example, a document identifier (e.g., a primary key) of a document may be associated with one or more foreign keys and/or primary keys. In this way, the document giving rise to the relation (e.g., an email with multiple MIME parts) need only be analyzed once, advantageously resulting in reduced computational (e.g., processor) resources and loading. Thus, when the active learning process displays the root document, or a list of documents, the active learning process is able to identify the related documents by querying the cached information.

The method 1100 includes generating a batch of documents based on the relevance rank for the set of documents, wherein the relationally-linked family documents are included in the batch adjacent to the ranked relevant document (block 1106). For example, the backend server 1006 may receive/retrieve a document identifier from the client device 1002. The backend server 1006 may generate the batch of documents by selecting documents that are associated with the document identifier from the communication corpus 1030. Herein, "adjacency" and/or "adjacent to" may refer to the adjacency of two or more vertices (e.g., two or more documents stored in a tree/graph data structure) and/or the manifestation of such vertices in a display (e.g., that two or more documents are displayed in a windowed environment such as the payload window 502 and the coding window 504 of FIG. 5, or another windowed/graphical user interface environment.

The method 1100 includes causing the batch of documents to be displayed on a display screen of a computing device (block 1108). For example, when the user views the active learning application, method 1100 may display a batch (e.g., a list) of documents as in FIG. 4. When the user selects one of the displayed documents, the active learning application may display the content of the document in the document view user interface 500, wherein any documents related to the selected document are displayed in the coding window 504, or in another user interface window that is above, or next to, the payload window 502.

XIV. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for practicing the techniques disclosed herein through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed:

1. A computer-implemented method for conducting family-based review of a set of documents in an active learning process, comprising:
    selecting, from the set of documents in the active learning process, a document ranked as relevant by a machine learning model,
    identifying a set of family documents relationally-linked to the ranked relevant document according to a hierarchical structure,
    generating a batch of documents based on a relevance rank for the set of documents, wherein the relationally-linked family documents are included in the batch adjacent to the ranked relevant document, and
    causing the batch of documents to be displayed on a display screen of a computing device.

2. The computer-implemented method of claim 1, wherein selecting, from the set of documents in the active learning process, the document ranked as relevant by the machine learning model includes selecting from a set of documents with the highest relevance ranking certainty score.

3. The computer-implemented method of claim 1, wherein selecting, from the set of documents in the active learning process, the document ranked as relevant by the machine learning model includes selecting from a set of documents with the lowest relevance ranking certainty score.

4. The computer-implemented method of claim 1, wherein the set of documents comprise emails, and identifying the set of family documents relationally-linked to the ranked relevant document includes identifying one or more email attachments corresponding to the ranked relevant document.

5. The computer-implemented method of claim 1, wherein identifying the set of family documents relationally-linked to the ranked relevant document includes clustering the set of documents using a clustering algorithm.

6. The computer-implemented method of claim 1, wherein the relationally-linked family documents included in the batch adjacent to the ranked relevant document are represented in a tree data structure.

7. The computer-implemented method of claim 1, further comprising
    receiving, from a client computing device, a coding decision corresponding to a document, and
    analyzing the coding decision and an identifier associated with the document to generate an updated machine learning model.

8. A family-based review computing system, comprising one or more processors; and
    a memory storing instructions that, when executed, cause the computing system to:
    select, from a set of documents in an active learning process, a document ranked as relevant by a machine learning model,
    identify a set of family documents relationally-linked to the ranked relevant document according to a hierarchical structure,
    generate a batch of documents based on a relevance rank for the set of documents, wherein the relationally-linked family documents are included in the batch adjacent to the ranked relevant document, and
    cause the batch of documents to be displayed on a display screen of a computing device.

9. The family-based review computing system of claim 8, wherein the memory stores further instructions that when executed, cause the computing system to:
    select from a set of documents with the highest relevance ranking certainty score.

10. The family-based review computing system of claim 8, wherein the memory stores further instructions that when executed, cause the computing system to:
    select from a set of documents with the lowest relevance ranking certainty score.

11. The family-based review computing system of claim 8, wherein the memory stores further instructions that when executed, cause the computing system to:
    identify one or more email attachments corresponding to the ranked relevant document.

12. The family-based review computing system of claim 8, wherein the memory stores further instructions that when executed, cause the computing system to:
    cluster the set of documents using a clustering algorithm.

13. The family-based review computing system of claim 8, wherein the memory stores further instructions that when executed, cause the computing system to:
    generate a tree data structure, wherein the ranked relevant document and relationally-linked family documents are adjacent in the tree data structure.

14. The family-based review computing system of claim 8, wherein the memory stores further instructions that when executed, cause the computing system to:
    receive, from a client computing device, a coding decision corresponding to a document, and
    analyze the coding decision and an identifier associated with the document to generate an updated machine learning model.

15. A non-transitory computer readable medium storing program instructions that when executed, cause a computer system to:
    select, from a set of documents in an active learning process, a document ranked as relevant by a machine learning model,
    identify a set of family documents relationally-linked to the ranked relevant document according to a hierarchical structure,
    generate a batch of documents based on a relevance rank for the set of documents, wherein the relationally-linked family documents are included in the batch adjacent to the ranked relevant document, and
    cause the batch of documents to be displayed on a display screen of a computing device.

16. The non-transitory computer readable medium of claim 15, including further program instructions that when executed, cause a computer system to:
    select from a set of documents with the highest relevance ranking certainty score.

17. The non-transitory computer readable medium of claim 15, including further program instructions that when executed, cause a computer system to:
    select from a set of documents with the lowest relevance ranking certainty score.

18. The non-transitory computer readable medium of claim 15, including further program instructions that when executed, cause a computer system to:
    identify one or more email attachments corresponding to the ranked relevant document.

19. The non-transitory computer readable medium of claim 15, including further program instructions that when executed, cause a computer system to:
cluster the set of documents using a clustering algorithm.

20. The non-transitory computer readable medium of claim 15, including further program instructions that when executed, cause a computer system to: generate a tree data structure, wherein the ranked relevant document and relationally-linked family documents are adjacent in the tree data structure.

* * * * *